(12) United States Patent
Ikemoto et al.

(10) Patent No.: US 11,285,634 B2
(45) Date of Patent: Mar. 29, 2022

(54) VENEER SHEET CONVEYING APPARATUS AND METHOD OF CONTROLLING THE SAME

(71) Applicant: Meinan Machinery Works, Inc., Obu (JP)

(72) Inventors: Fumitoshi Ikemoto, Obu (JP); Hidetaka Yamada, Obu (JP)

(73) Assignee: MEINAN MACHINERY WORKS, INC., Obu (JP)

( * ) Notice: Subject to any disclaimer, the term of this patent is extended or adjusted under 35 U.S.C. 154(b) by 211 days.

(21) Appl. No.: 16/494,758

(22) PCT Filed: Aug. 11, 2018

(86) PCT No.: PCT/JP2018/030163
§ 371 (c)(1),
(2) Date: Sep. 16, 2019

(87) PCT Pub. No.: WO2020/035890
PCT Pub. Date: Feb. 20, 2020

(65) Prior Publication Data
US 2021/0237307 A1    Aug. 5, 2021

(51) Int. Cl.
*B27L 5/08*        (2006.01)
*B27D 1/00*        (2006.01)
(Continued)

(52) U.S. Cl.
CPC .................. *B27L 5/08* (2013.01); *B27D 1/00* (2013.01); *B07C 3/08* (2013.01); *B27L 5/002* (2013.01);
(Continued)

(58) Field of Classification Search
CPC ... B27L 5/00; B27L 5/002; B27L 5/08; B65H 2701/1938
See application file for complete search history.

(56) References Cited

U.S. PATENT DOCUMENTS 4,765,214 A * 8/1988 Nakaya ................... B27L 5/002
                                                    198/418.4
4,781,091 A * 11/1988 Nakaya ................ B26D 7/1836
                                                    198/441
(Continued)

FOREIGN PATENT DOCUMENTS

JP          S55-9831 A      1/1980
JP          S55-23528 A     6/1980
(Continued)

*Primary Examiner* — Matthew Katcoff
(74) *Attorney, Agent, or Firm* — United IP Counselors, LLC

(57) ABSTRACT

When a veneer conveyed out by a discharging conveyor is a product veneer, a sorting apparatus is rotationally driven to pierce the product veneer with needle-like bodies by a guide member and a push-up member (a rolling bearing). When the veneer conveyed out by the discharging conveyor is a trash veneer, the sorting apparatus is rotationally driven so that the trash veneer is not pierced by the needle-like body. With this configuration, the progress of the abrasion of the needle-like bodies can be delayed as compared with the configuration in which the product veneer and the trash veneer are both pierced by the needle-like body. As a result, the time to replace the needle-like bodies can be extended, whereby the running cost can be reduced.

14 Claims, 41 Drawing Sheets

(51) Int. Cl.
*B07C 3/08* (2006.01)
*B27L 5/00* (2006.01)
*B65G 17/32* (2006.01)

(52) U.S. Cl.
CPC ...... *B65G 17/32* (2013.01); *B65H 2701/1938* (2013.01)

(56) References Cited

U.S. PATENT DOCUMENTS

| | | |
|---|---|---|
| 6,338,484 B1 | 1/2002 | Puranen et al. |
| 8,813,947 B1 | 8/2014 | Tracy et al. |
| 9,365,365 B2 | 6/2016 | Tracy et al. |
| 2013/0048471 A1 | 2/2013 | Capps, Jr. |

FOREIGN PATENT DOCUMENTS

| | | | |
|---|---|---|---|
| JP | S57-20884 B2 | | 5/1982 |
| JP | H05-193713 A | | 8/1993 |
| JP | 2002292606 A | * | 10/2002 |

* cited by examiner

VENEER SHEET CONVEYING APPARATUS AND METHOD OF CONTROLLING THE SAME

CROSS-REFERENCE TO RELATED APPLICATIONS

This application is the U.S. National Phase of International Application No. PCT/JP2018/30163, filed Aug. 11, 2018, which is incorporated by reference in its entirety.

BACKGROUND

1. Field of the Invention

The present invention relates to a veneer sheet sorting apparatus configured to sort veneers into product veneers and trash veneers, the veneers being discharged from a veneer cutting machine and cut into the product veneers and the trash veneers by a cutter and continuously conveyed out toward the downstream.

2. Description of the Related Art

Japanese Patent Publication No. 55-23528 discloses a veneer sheet conveying apparatus including a discharging conveyor for conveying out veneers discharged from a veneer cutting machine and cutting into product veneers and trash veneers by a cutter, a piercing-conveying conveyer disposed above downstream of the discharging conveyor for piercing and conveying the product veneers and the trash veneers conveyed out by the discharging conveyor with a needle-like body, and a needle removal mechanism for removing at respective predetermined positions the needle-like body from the product veneer and trash veneers conveyed by the piercing-conveying conveyor to thereby sort the veneers into product veneers and trash veneers.

The veneer sheet conveying apparatus has a structure in which veneers discharged from the veneer cutting machine and cut the veneers into product veneers and trash veneers by the cutter are automatically sorted in the conveyance process and separated into product veneers and trash veneers thereby improving work efficiency.

BRIEF SUMMARY

The needle-like body of the piercing-conveying conveyor commonly has a falling-off prevention part that hooks the pierced veneer to prevent the veneer from coming off the needle-like body and fall off therefrom by its own weight when being pierced. Continue use of the needle-like body causes abrasion of the falling-off prevention part and so in order to maintain stable holding and conveying of the veneer, the needle-like body needs to be periodically replaced. In this respect, there is a demand to reduce the running cost by extending as much as possible the time to replace the needle-like body. Work efficiency can be improved in the veneer sheet conveying apparatus described in the above-mentioned publication, however, there is still room for improvement in terms of reducing the running cost.

The present invention has been made in view of the above and an object thereof is to provide a technique that contributes to the reduction of running cost when conveying a veneer sheet.

A veneer sheet sorting apparatus, a veneer sheet conveying apparatus including the same, and a veneer sheet sorting method of the present invention employ the following means in order to achieve the aforementioned object.

In accordance with a preferred embodiment of a veneer sheet sorting apparatus according to the present invention, the veneer sheet sorting apparatus, which is installed in a veneer sheet conveying apparatus including a discharging unit and a piercing-conveying unit, is configured to sort a veneer conveyed out by the discharging unit into a product veneer and a trash veneer. The discharging unit has a mounting surface for mounting the veneer discharged from a veneer cutting machine and cut into the product veneer and the trash veneer by a cutter, and is configured to continuously convey out the product veneer and the trash veneer toward downstream of the discharging unit. The piercing-conveying unit has a plurality of needle-like bodies and is configured to be disposed above the discharging unit so that the needle-like bodies are opposed to the mounting surface of the discharging unit so as to be capable of transporting the veneer toward a subsequent process. The veneer sheet sorting apparatus is configured to sort the veneer by guiding the product veneer toward the piercing-conveying unit so that the needle-like bodies are pierced into the product veneer when the veneer is a product veneer, whereas when the veneer is a trash veneer, by guiding the trash veneer to the downstream so as not to be pierced by the needle-like bodies.

In the present invention, the term "product veneer" preferably includes a short end veneer, in addition to a standard-length veneer. It is to be noted that the standard-length veneer is defined as a veneer that satisfies the standard dimension defined as a product, and that the short end veneer is defined as a veneer not meeting the defined standard dimensions but which satisfies a predetermined dimension from which a product may be obtained. Moreover, the term "trash veneer" in the present invention refers to a veneer that does not satisfy a predetermined dimension to procure a product. Further, the term "mounting surface" in the present invention corresponds to the upper surface of a belt when the discharging unit is configured by a conveyor belt.

According to the present invention, since the veneer sheet sorting apparatus has a configuration in which, out of the veneer conveyed out by the discharging unit, only the product veneer is pierced by the needle-like bodies of the piercing-conveying unit and conveyed to a subsequent process. That is, the present invention is configured such that when the veneer conveyed out by the discharging unit is the trash veneer, the needle-like bodies of the piercing-conveying unit do not pierce the trash veneer. Hence, the progress of the abrasion of the needle-like bodies can be delayed as compared with the configuration in which the trash veneer is also pierced by the needle-like bodies of the piercing-conveying unit and conveyed to a subsequent process. As a result, the time to replace the needle-like bodies can be extended and the running cost can be reduced.

In accordance with a further embodiment of the veneer sheet sorting apparatus according to the present invention, the veneer sheet sorting apparatus includes an action section that acts directly on the product veneer and is configured so that the product veneer is guided toward the piercing-conveying unit by the action section. Here, "directly acting on a product veneer" in the present invention literally corresponds to an aspect in which at least a portion of the action section directly abuts or contacts the product veneer to guide the product veneer toward the piercing-conveying unit. For example, taken into consideration are aspects in which the product veneer is pushed up from below or sucked up from above using a suction cup.

According to this embodiment, since the veneer sheet sorting apparatus has a configuration in which the action section is rendered to act directly on the product veneer to guide the product veneer toward the piercing-conveying unit, the product veneer can be guided toward the piercing-conveying unit with a simple configuration.

In accordance with yet a further embodiment of the veneer sheet sorting apparatus according to the present invention, the action section is configured to be switchable between a guiding state where a distance between at least a portion of the action section and the needle-like bodies is smaller than a thickness of the veneer, and a non-guiding state where the distance is greater than the thickness of the veneer. The action section is configured to be in the guiding state when the veneer is a product veneer, and in the non-guiding state when the veneer is a trash veneer. In the present invention, an aspect in which a gap is formed between the action section and the needle-like bodies wherein the gap being smaller than the thickness of the veneer corresponds to an aspect "the distance between the action section and the needle-like bodies is smaller than the thickness of the veneer." However, preferably included is an aspect in which the gap between the action section and the needle-like bodies is eliminated by having a configuration in which the action section and the needle-like bodies apparently intersect, for example, a configuration in which a portion of the needle-like bodies apparently bites into the action section.

According to this embodiment, with a simple configuration of just switching the action section between the guiding state and the non-guiding state, the product veneer can be guided so as to be reliably pierced by the needle-like bodies and the trash veneer can be guided to the downstream without being pierced by the needle-like bodies. Consequently, the product veneer and the trash veneer can be reliably sorted and the transport of the product veneer by the piercing-conveying unit to a subsequent process can be stabilized.

In accordance with a further embodiment of the veneer sheet sorting apparatus according to the present invention, the veneer sheet sorting apparatus includes a rotary shaft and a rotary member as the action section integrally mounted to the rotary shaft; wherein the veneer sheet sorting apparatus is configured to be switchable between the guiding state and the non-guiding state by rotation of the rotary shaft. Note that the phrase "integrally mounted to the rotary shaft" in the present invention, in addition to referring to the aspect in which the rotary member is integrally formed with the rotary shaft, preferably includes an aspect in which the rotary member is integrated with the rotary shaft after being separately formed from the rotary shaft.

According to this embodiment, a simple configuration in which the rotary shaft is rotated makes it possible to switch the state between the guiding state and the non-guiding state.

In accordance with yet a further embodiment of the veneer sheet sorting apparatus according to the present invention, the action section includes a first lifting part configured to be capable of lifting a downstream end portion of the product veneer, and an assisting part for assisting the piercing of needle-like bodies into the product veneer.

According to this embodiment, it is possible to reliably lift only the product veneer from among the product veneer and the trash veneer that are continuously conveyed out to thereby guide the product veneer toward the piercing-conveying unit, and the needle-like bodies are able to be reliably pierced into the product veneer guided to the piercing-conveying unit. Thus, conveying the product veneer to a subsequent process by piercing-conveying unit can be stabilized.

In accordance with yet a further embodiment of the veneer sheer sorting apparatus according to the present invention in which the action section includes the rotary shaft and the rotary member, the rotary member further includes a second lifting part for lifting an upstream end portion of the product veneer.

According to this embodiment, it is possible to reliably lift only the product veneer from among the product veneer and the trash veneer that are continuously conveyed out to thereby guide the product veneer toward the piercing-conveying unit.

In accordance with yet a further embodiment of the veneer sheet sorting apparatus according to the present invention, the action section has an inclined surface which is inclined upward toward the downstream when entering the guiding state. The action section is configured so that the inclined surface thereof guides the product veneer towards the piercing-conveying unit.

According to this embodiment, the product veneer can be smoothly guided toward the piercing-conveying unit.

In accordance with yet a further embodiment of the veneer sheet sorting apparatus according to the present invention, the inclined surface is configured as a circular arc surface so that the distance of the inclined surface from the axis line of the rotary shaft is constant. The first lifting part, the assisting part, and the second lifting part are connected each other by the circular arc surface.

According to this embodiment, when the product veneer is guided to the piercing-conveying unit while the rotary member is rotating, the piercing state of the needle-like bodies with respect to the product veneer, that is, the piercing depth can be kept constant. With this configuration, conveyance of the product veneer by the piercing-conveying unit can be stabilized.

In accordance with yet a further embodiment of the veneer sheet sorting apparatus according to the present invention, the veneer sheet sorting apparatus further includes a push-up section capable of pushing up at least a part of the mounting surface in a direction approaching the needle-like bodies, and is configured such that the push-up section pushes up at least a part of the mounting surface to thereby guide the product veneer toward the piercing-conveying unit.

According to this embodiment, the product veneer can be guided toward the piercing-conveying unit with a simple configuration since at least a part of the mounting surface is merely pushed up in the direction approaching the needle-like bodies. In the case of employing the configuration in which the push-up section is mounted together with the action section, the action section guides the product veneer to the needle-like bodies in a state where the mounting surface is brought close to the needle-like bodies by the push-up section. Therefore, the behavior of the product veneer towards the needle-like bodies can be reduced to a small level as compared with the configuration without the push-up section. As a result, the occurrence of buckling of the product veneer can be decreased, and the occurrence of drawbacks such as the clogging of sheets can be decreased.

In accordance with yet a further embodiment of the veneer sheet sorting apparatus according to the present invention, the push-up section has a second rotary member integrally and eccentrically mounted to the rotary shaft. The second rotary member is configured to abut the lower side of the mounting surface in accordance with the rotation of the rotary shaft so as to push up the mounting surface. Note that the phrase "integrally mounted to the rotary shaft" in the present invention, in addition to referring to the aspect in which the push-up section is integrally formed with the rotary shaft, preferably includes an aspect in which the push-up section is integrated with the rotary shaft after being separately formed from the rotary shaft.

According to this embodiment, at least a part of the mounting surface can be pushed up in a direction approaching the needle-like bodies with a very simple configuration of rotating the rotary shaft.

In accordance with a preferred embodiment of a veneer sheet conveying apparatus according to the present invention, the veneer sheet conveying apparatus is configured to convey a veneer that is discharged from a veneer cutting machine and cut into a product veneer and trash veneer by a cutter. The veneer sheet conveying apparatus includes a discharging unit, a piercing-conveying unit, the veneer sheet sorting apparatus according to any one of the above-described aspects of the present invention, and a controller for controlling the veneer sheet conveying apparatus. The discharging unit has a mounting surface for mounting the veneer cut by the cutter and is configured to continuously convey out the product veneer and the trash veneer toward downstream of the discharging unit. In addition, the piercing-conveying unit has a plurality of needle-like bodies and is configured to be disposed above the discharging unit so that the needle-like bodies are opposed to the mounting surface of the discharging unit so as to be capable of transporting the veneer toward a subsequent process.

According to this embodiment, given that the configuration thereof includes the veneer sheet sorting apparatus according to the present invention of any one of the above-mentioned aspects, the same effects as those exhibited by the veneer sheet sorting apparatus of the present invention are achieved, for example, delaying the progress of the abrasion of the needle-like bodies. Thereby, the time to replace the needle-like bodies can be extended and the effect of being able to reduce the running cost can be achieved.

In accordance with a further embodiment of the veneer sheet conveying apparatus according to the present invention of the aspect in which the veneer sheet sorting apparatus includes the action section including the first lifting part and the assisting part, the controller drive-controls the veneer sheet sorting apparatus so that the first lifting part of the action section lifts up the downstream end portion of the product veneer. The controller also drive-controls the veneer sheet sorting apparatus so that the action section is in the assisting state in which the assisting part assists the piercing of the needle-like bodies into the product veneer, and the controller further drive-controls the veneer sheet sorting apparatus to temporarily stop the operation of the action section when the action section is in the assisting state.

According to this embodiment, since the configuration thereof is that the operation of the action section is temporarily stopped while the action section is maintained in the assisting state, the needle-like bodies can be reliably and stably pierced into the product veneer that is being guided toward the piercing-conveying unit. Thus, conveying the product veneer to a subsequent process by piercing-conveying unit can be stabilized.

In accordance with a further embodiment of the veneer sheet conveying apparatus according to the present invention, the controller drive-controls the veneer sheet sorting apparatus so that the conveying speed of the action section to convey the product veneer toward the piercing-conveying unit is substantially the same as the conveying-out speed of the veneer conveyed by the discharging unit at least when the downstream end portion of the product veneer is being lifted by the first lifting part.

According to this embodiment, the present invention ensures reliable lifting of only the product veneer from the product veneer and the trash veneer which are continuously conveyed out, and to guide the product veneer toward the piercing-conveying unit.

In accordance with a further embodiment of the veneer sheet conveying apparatus according to the present invention of the aspect in which the veneer sheet sorting apparatus includes the action section including the second lifting part, the controller drive-controls the veneer sheet sorting apparatus so that the conveying speed of the rotary member to convey the product veneer toward the piercing-conveying unit is substantially the same as the conveying-out speed of the veneer conveyed by the discharging unit at least when the upstream end portion of the product veneer is lifted by the second lifting part.

According to this embodiment, the present invention ensures reliable lifting of only the product veneer from the product veneer and the trash veneer which are continuously conveyed out, and to guide the product veneer toward the piercing-conveying unit.

In accordance with yet a further embodiment of the veneer sheet conveying apparatus according to the present invention, the veneer sheet conveying apparatus further includes a signal transmission member that transmits a signal upon cutting of the veneer into the product veneer and the trash veneer by the cutter. Then, the controller drive-controls the veneer sheet sorting apparatus based on the transmitted signal.

According to this embodiment, a boundary between the cut veneers can be surely recognized by transmitting a signal upon cutting of the veneer. The present invention is configured to separate a product veneer and an trash veneer based on this boundary and thus capable of reliably sorting the product veneer and trash veneer which are being successively conveyed out.

In accordance with yet a further embodiment of the veneer sheet conveying apparatus according to the present invention, the veneer sheet conveying apparatus is configured such that the veneer cut by the cutter is conveyed toward the veneer sheet sorting apparatus in a state where a predetermined gap is secured between the cut veneer.

According to this embodiment, due to the boundary between the cut veneer being made clear, the sorting of product veneer and trash veneer by the sorting apparatus can be facilitated.

In accordance with yet a further embodiment of the veneer sheet conveying apparatus according to the present invention, the veneer sheet conveying apparatus further includes a loading unit configured to load to the cutting machine the veneer discharged from the veneer cutting machine. The veneer sheet conveying apparatus is configured to make a conveying-in speed of the veneer conveyed by the loading unit different from a conveying-out speed of the veneer conveyed by the discharging unit whereby a predetermined gap is secured between the veneers.

According to this embodiment, the predetermined gap can be easily provided between the cut veneers by only making a difference between the conveying-in speed of the veneers conveyed by the loading unit and the conveying-out speed of the veneers conveyed by the discharging unit.

In accordance with a preferred embodiment of a veneer sheet sorting method according to the present invention, the veneer sheet sorting method of the veneer sheet conveying apparatus including the discharging unit and the piercing-conveying unit sorts the veneer conveyed out by the discharging unit into a product veneer and a trash veneer. The discharging unit is configured to have a mounting surface for mounting the veneer discharged from the veneer cutting machine and cut into the product veneer and the trash veneer by the cutter and to continuously convey the product veneer and the trash veneer toward the downstream. The piercing-conveying unit is configured to have a plurality of needle-like bodies and is disposed above the discharging unit so that the needle-like bodies are opposed to the mounting surface of the discharging unit and capable of conveying the veneer toward a subsequent process. The veneer sheet sorting method sorts the veneer by guiding (a) the product veneer toward the piercing-conveying unit so that the needle-like bodies are pierced into the product veneer when the veneer is the product veneer, and (b) the trash veneer to the downstream so as not to be pierced by the needle-like bodies when the veneer is the trash veneer.

According to the present invention, a configuration thereof is that out of the veneer conveyed out by the discharging unit, only the product veneer is pierced by the needle-like bodies of the piercing-conveying unit and conveyed to a subsequent process. That is, the present invention is configured such that when the veneer conveyed out by the discharging unit is the trash veneer, the needle-like bodies of the piercing-conveying unit do not pierce the trash veneer. Hence, the progress of the abrasion of the needle-like bodies can be delayed as compared with the configuration in which the trash veneer is also pierced by the needle-like bodies of the piercing-conveying unit and conveyed to the subsequent process. As a result, the time to replace the needle-like bodies can be extended and the running cost can be reduced.

According to the present invention, the technique that contributes to running cost reduction can be provided for conveying veneers.

DETAILED DESCRIPTION

Next, the best mode for carrying out the present invention will be described using exemplary embodiments.

Embodiment 1

Figure 1:
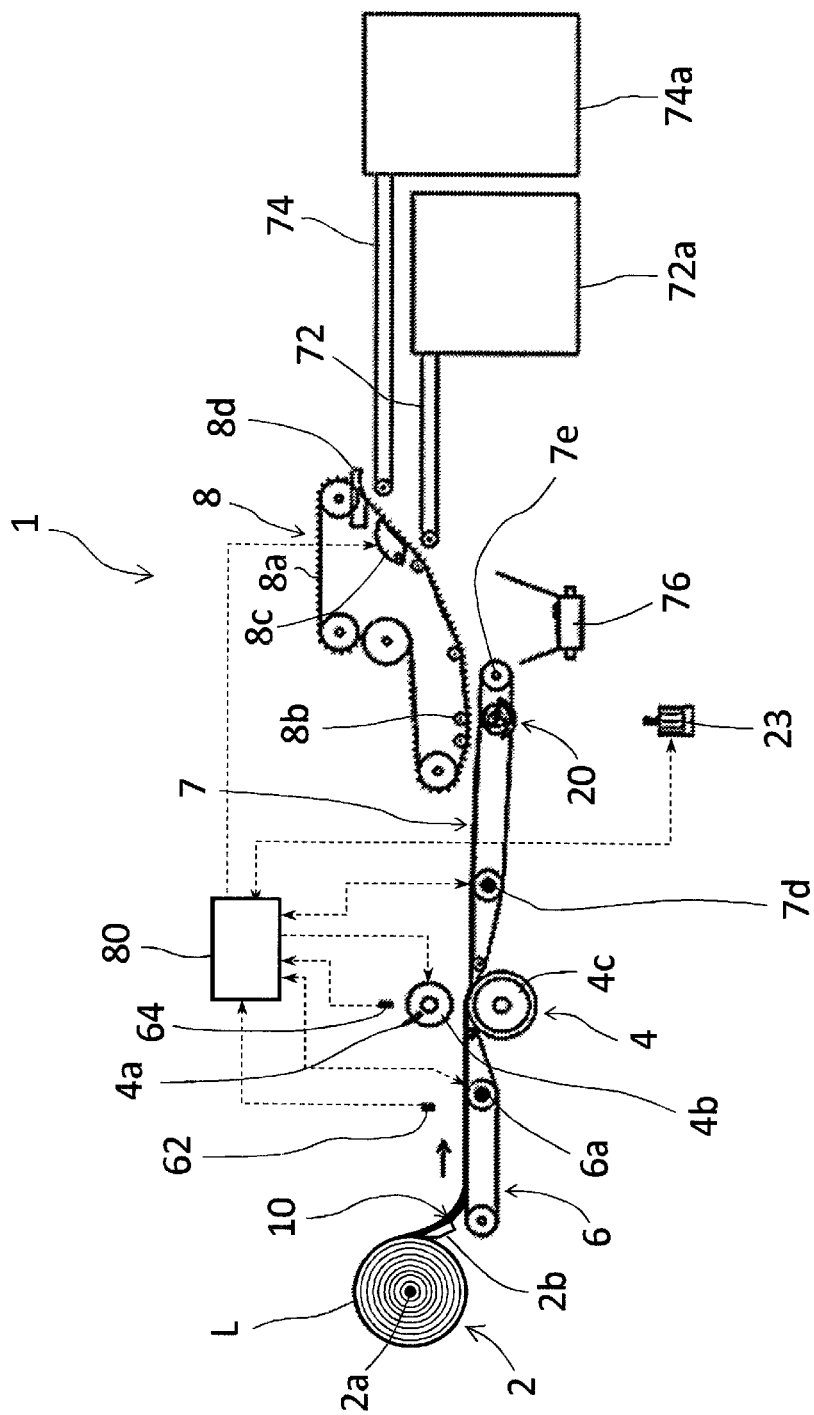
FIG. 1 is a schematic block diagram illustrating the outline of a structure of a veneer conveying apparatus 1 that includes a sorting apparatus 20 according to an embodiment of the present invention.

As illustrated in FIG. 1, a veneer sheet conveying apparatus 1 according to an exemplary embodiment of the present invention is composed of: a rotary lathe 2 for peeling veneer 10 from a log-shaped raw wood L; a cutting device 4 for cutting the veneer 10 into product veneer 12 and a trash veneer 14 (refer to FIG. 6) to be described later; a loading conveyor 6 for conveying the veneer 10 peeled by the rotary lathe 2 to the cutting device 4; discharging conveyor 7 for continuously conveying out the veneer 10 (product veneer 12 and trash veneer 14) cut by the cutting device 4; a sorting apparatus 20 according to an embodiment of the present invention for sorting the veneer 10 (product veneer 12 and trash veneer 14) conveyed out by the discharging conveyor 7 into product veneer 12 and trash veneer 14 (refer to FIG. 6); a piercing-conveying conveyor 8 for conveying the product veneer 12 (refer to FIG. 6) distributed by the sorting apparatus 20; transport conveyors 72 and 74 for transporting the product veneer 12 (refer to FIG. 6) conveyed by the piercing-conveying conveyor 8 to deposition boxes 72a and 74a; an trash conveyor 76 for conveying the trash veneer 14 (refer to FIG. 6) distributed by the sorting apparatus 20 to a deposition box not shown in the drawing; and a controller 80 for controlling the entire veneer sheet conveying apparatus 1. Note that in the present embodiment, the veneer 10 (the product veneer 12 and the trash veneer 14) is configured to be transported from the left to the right in FIG. 1 in the direction orthogonal to the fiber direction. The left side of FIG. 1 is defined as "upstream" and the right side of FIG. 1 is defined as "downstream". Further, the dimension of the veneer 10 (the product veneer 12 and the trash veneer 14) in the direction along the fiber direction is defined as "width dimension", and the dimension of the veneer 10 (the product veneer 12 and the trash veneer 14) in the direction along the direction orthogonal to the fiber direction is defined as the "length dimension".

The rotary lathe 2 is configured as a cutting device and has a spindle 2a that clamps the central parts of both end faces of the log-shaped raw wood L in the longitudinal direction, and while spinning the raw wood L around the axis of the spindle 2a, a cutter 2b is moved so as to approach the raw wood L by a distance corresponding to a desired thickness to be peeled for each rotation of the spindle 2a to thereby peel off a continuous slice of the veneer 10 having the desired thickness from the raw wood L (rotary cut type). The rotary lathe 2 is an example of an implementation configuration corresponding to the "veneer cutting machine" in the present invention.

The cutting device 4 is configured as a device for cutting the veneer 10 into the product veneer 12 and the trash veneer 14 (refer to FIG. 6) at boundaries K, M, and 0 to be described later, and includes a rotary blade 4a mainly for cutting the veneer 10 that are conveyed thereto, a rotary table 4b to which the rotary blade 4a is fixed, and an anvil roll 4c that serves as a cutting board when the rotary blade 4a cuts the veneer 10. The rotary blade 4a is rotated so that the peripheral speed of the cutting edge of the rotary blade 4a is synchronized with the peripheral speed of the anvil roll 4c when the veneer 10 conveyed in is on the anvil roll 4c, causing the cutting edge to bite into the anvil roll 4c thereby cutting the veneer 10. The cutting device 4 is an example of an implementation configuration corresponding to the "cutter" in the present invention.

Further, as illustrated in FIG. 1, the cutting device 4 includes a cutting detection sensor 64. A cutting signal is output from the cutting detection sensor 64 at the instant when the cutting device 4 cuts each of the veneer 10. For example, a configuration may be adopted in which a piece of iron (not shown) is mounted to the rotary table 4b and the cutting detection sensor 64 is installed so as to detect the piece of iron the instant the veneer 10 is cut by the cutting device 4. Although the cutting detection sensor 64 used in the present embodiment is a non-contact type, the cutting detection sensor may be a contact type. Given this configuration, it can be said that the positions of the cutting edge of the rotary blade 4a and the cutting plane of the veneer 10 (boundary K, M, O) are the same the moment the veneer 10 is cut by the cutting device 4. Therefore, the position (boundary K, M, O) of the cutting plane of the veneer 10 at the instant when being cut by the cutting device 4 can be known because of the cutting signal. The cutting detection sensor 64 is an example of an implementation configuration corresponding to the "signal transmission member" in the present invention.

The loading conveyor 6 is configured as a conveyor belt for conveying to the cutting device 4 the veneer 10 peeled by the rotary lathe 2, and a pulse generator 6a is attached to a rotary shaft that rotationally drives the loading conveyor 6 as illustrated in FIG. 1. A predetermined number of pulse signals is output from the pulse generator 6a in accordance with the loading conveyor 6 conveying a predetermined number of the veneer 10. The moving amount of the veneer 10 transported can be obtained from the conveyance amount of the loading conveyor 6 per pulse signal and the integrated value of the pulse signals. The loading conveyor 6 is an example of an implementation configuration corresponding to the "loading unit" in the present invention.

Figure 6:
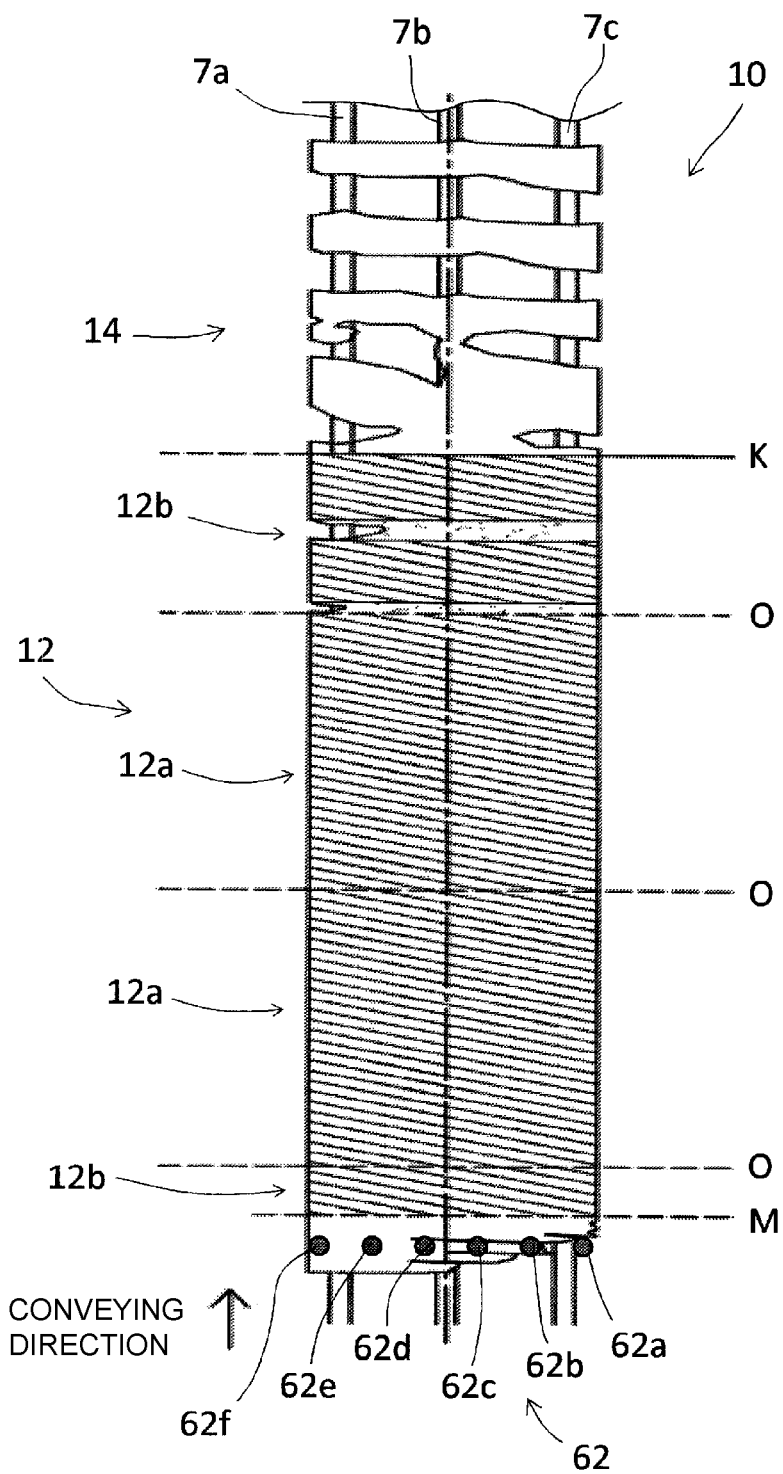
FIG. 6 is an explanatory view showing an example of the setting of boundaries K, O, M of a veneer 10.

Further, the loading conveyor 6 includes numerous veneer shape detection sensors 62 for detecting the shape of the veneer 10 conveyed by the loading conveyor 6. The plurality of the veneer shape detection sensors 62 are arranged in series along the left-right direction orthogonal to the conveyance direction of the veneer 10 (from the upstream side toward the downstream). As for the veneer shape detection sensors 62, in the present embodiment, a configuration is adopted in which six veneer shape detection sensors 62a, 62b, 62c, 62d, 62e, and 62f are arranged in order from right to left as illustrated in FIG. 6. Also, regarding the veneer shape detection sensors 62, it is desirable to use non-contact type sensors respectively, for example a photoelectric tube, in order to avoid the jamming of veneers.

Figure 2:
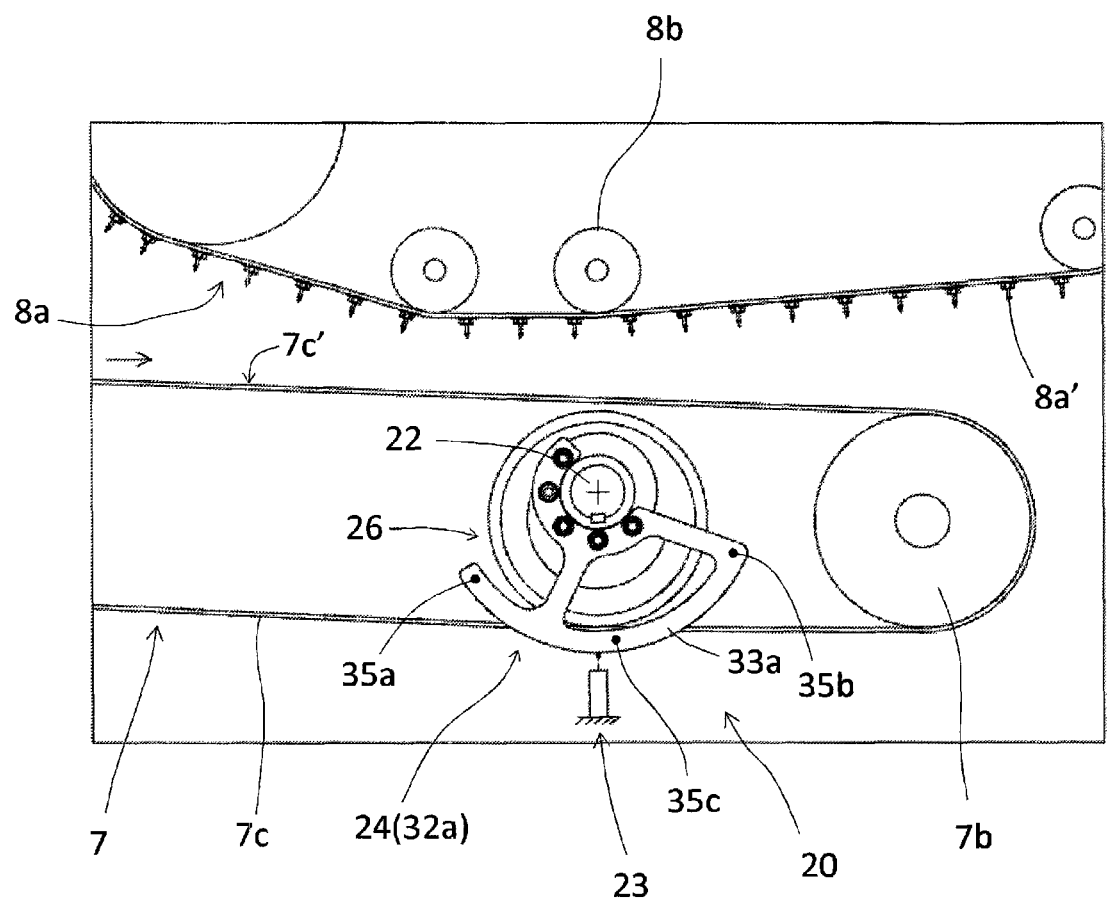
FIG. 2 is an enlarged view of a main part of the veneer conveying apparatus 1 illustrating in an enlarged manner the vicinity of the sorting apparatus 20 according to an embodiment of the present invention.
Figure 7:
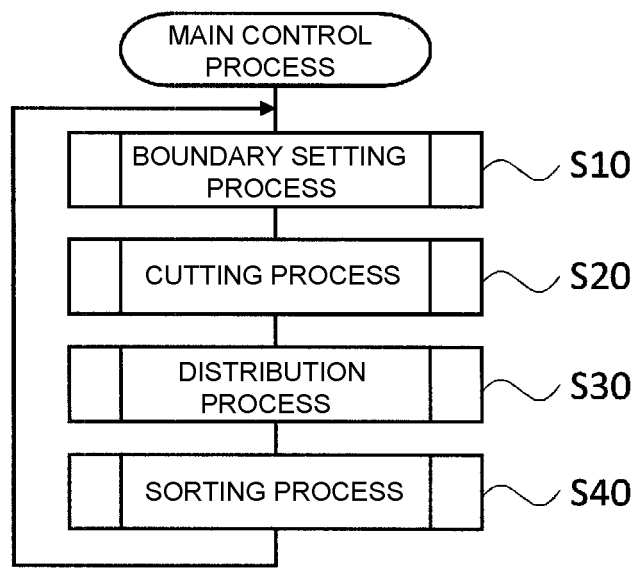
FIG. 7 is a flowchart illustrating an example of a main control process routine executed by a controller 80 of the veneer conveying apparatus 1 that includes the sorting apparatus 20 according to an embodiment of the present invention.

The discharging conveyor 7 is configured as a conveyor belt for conveying the veneer 10 (the product veneer 12 and the trash veneer 14) cut by the cutting device 4, and as illustrated in FIG. 7, has three belts 7a, 7b and 7c arranged at equal gaps in a direction (the left and right direction in FIG. 6) orthogonal to the conveying direction (upper direction in FIG. 6). As illustrated in FIG. 2, the belts 7a, 7b, and 7c have mounting surfaces 7a', 7b', and 7c' on which the veneer 10 is placed (only the belt 7c and the mounting surface 7c' are described in FIG. 2). Also, as illustrated in FIG. 1, a pulse generator 7d is attached to a rotary shaft that rotationally drives the discharging conveyor 7. A predetermined number of pulse signals is output from the pulse generator 7a in accordance with a predetermined number of the veneers 10 (the product veneer 12 and the trash veneer 14) the discharging conveyor 7 conveys. The number of the veneers 10 (the product veneer 12 and the trash veneer 14) transported can be obtained from the conveyance amount of the discharging conveyor 7 per pulse signal and the integrated value of the pulse signals. The discharging conveyor 7 is an example of an implementation configuration corresponding to the "discharging unit" in the present invention, and the mounting surfaces 7a', 7b', and 7c' are examples of an implementation configuration corresponding to the "mounting surface" in the present invention.

Figure 3:
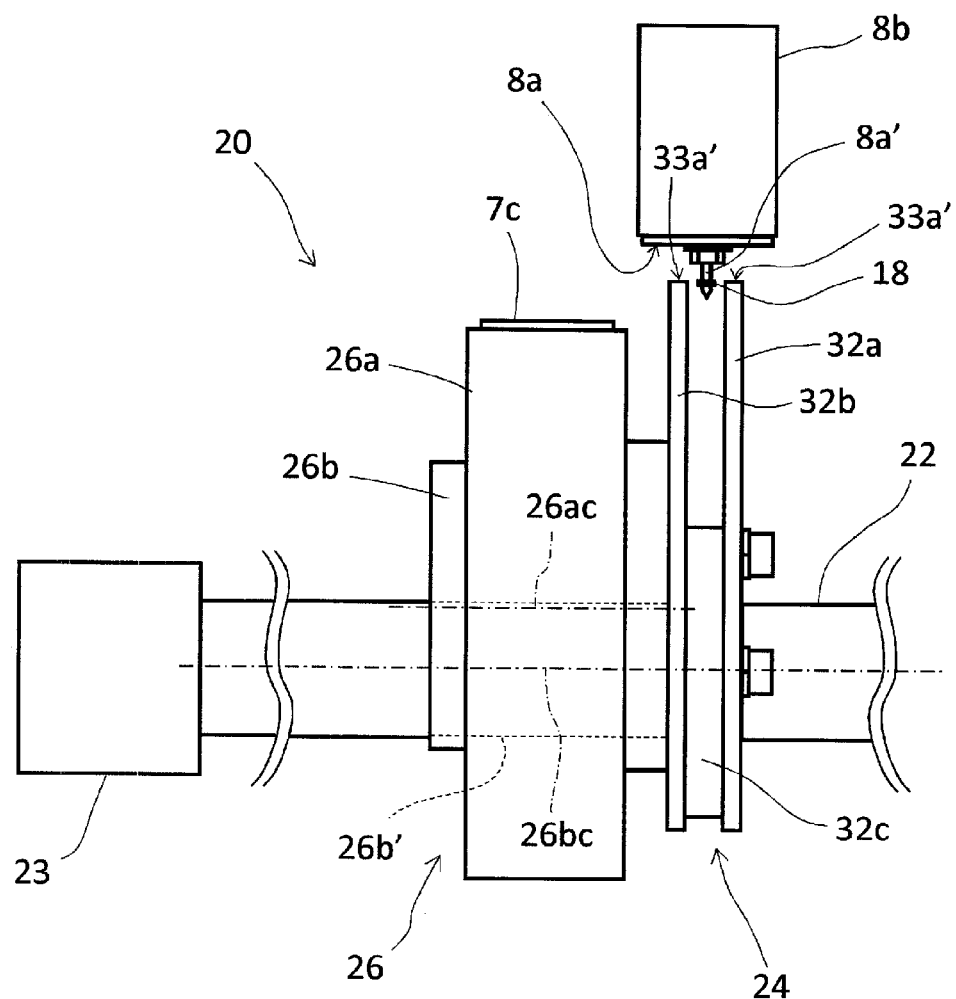
FIG. 3 is a schematic configuration diagram illustrating an outline of a configuration of the sorting apparatus 20 according to an embodiment of the present invention.
Figure 5:
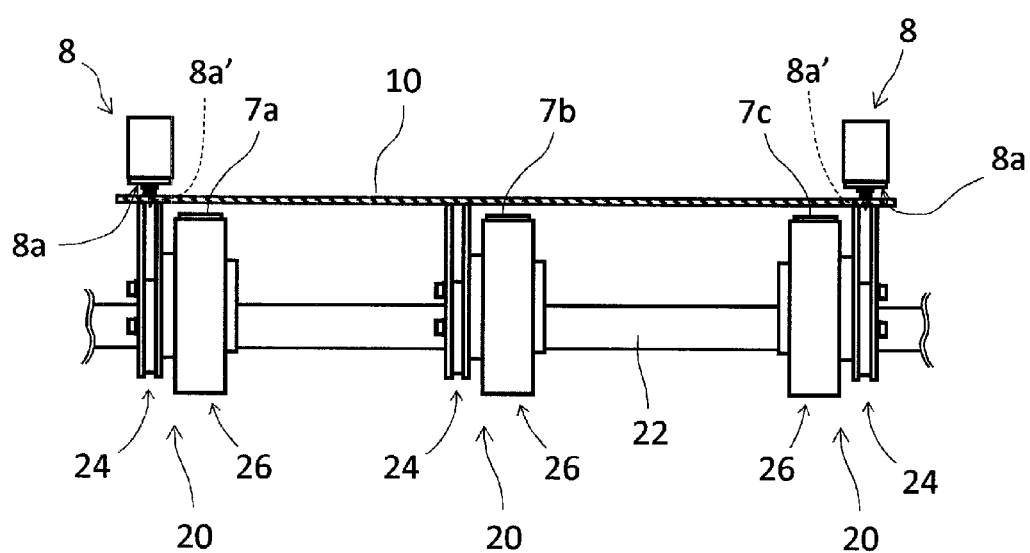
FIG. 5 is a cross-sectional view showing a cross unit A-A of FIG. 4.

The sorting apparatus 20 according to the embodiment of the present invention is, as illustrated in FIG. 1, disposed at a position adjacent to a support shaft 7e at the downstream end of the discharging conveyor 7. As illustrated in FIGS. 2 and 3, the sorting apparatus 20 includes a rotary shaft 22, and a guiding member 24 and a push-up member 26 both integrated with the rotary shaft 22. To correspond to each of the three belts 7a, 7b, and 7c of the discharging conveyor 7, in the present embodiment, a configuration is adopted in which three sorting apparatus 20 are respectively disposed in the arrangement direction of the belts 7a, 7b, and 7c (the left and right direction in FIG. 5) as illustrated in FIG. 5. It should be noted that, among the three sorting apparatus 20, as illustrated in FIG. 5, the sorting apparatus 20 disposed at both ends in the arrangement direction (left and right direction in FIG. 5) have an inverted relationship with each other, that is, the sorting apparatus 20 disposed at the right end is disposed in a state in which the sorting apparatus 20 disposed at the left end is horizontally reversed. The sorting apparatus 20 is an example of an implementation configuration corresponding to the "veneer sheet sorting apparatus" in the present invention.

As illustrated in FIG. 5, the rotary shaft 22 is disposed so as to extend in a direction (left and right direction in FIG. 5) orthogonal to the conveying direction (direction from the front to the far side of FIG. 5) (so that the rotary shaft 22 extends in a direction parallel to the axial direction of the support shaft 7e of the discharging conveyor 7), and a motor 23 is connected to one end of the rotary shaft 22 as illustrated in FIG. 3. The rotary shaft 22 is configured to be rotationally driven by the motor 23.

As illustrated in FIG. 3, the guiding member 24 includes a pair of guiding plates 32a and 32b, and a connecting boss portion 32c disposed so as to be held between the pair of guiding plates 32a and 32b for connecting the pair of guiding plates 32a and 32b. The guiding member 24 is an example of an implementation configuration corresponding to the "action section" and the "rotary member" in the present invention.

As illustrated in FIG. 3, the pair of guiding plates 32a and 32b are separated from each other by a predetermined clearance by the connecting boss portion 32c. It is to be noted that since the guiding plates 32a and 32b basically have the same configuration with each other, for convenience of explanation, the guiding plate 32a will be described as an example in the following whereas the description of the guiding plate 32b will be omitted.

Figure 4:
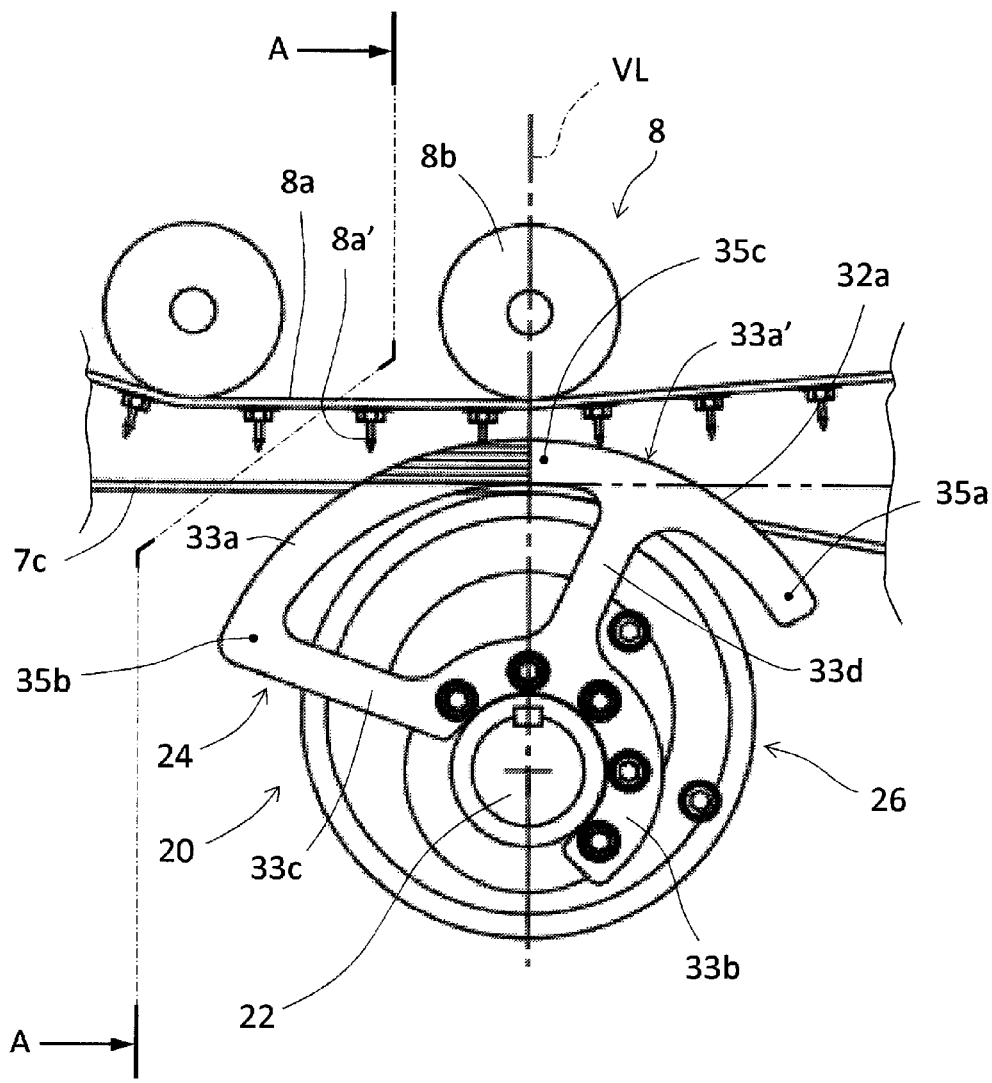
FIG. 4 is a front view of the sorting apparatus 20 according to an embodiment of the present invention as viewed from one side in the axial direction of a rotary shaft 22.

As illustrated in FIG. 4, the guiding plate 32a is configured in a substantially fan shape centered on the center of the rotary axis of the rotary shaft 22, and includes a rim portion 33a having an arc surface 33a', a hub portion 33b fastened to the rotary shaft 22, and web portions 33c and 33d coupling between the rim portion 33a and the hub portion 33b. As illustrated in FIGS. 2 and 4, the rim portion 33a is configured of: a projecting end portion 35a which is an end on one end side in the circumferential direction, specifically, the end on the front side (the downstream in the conveying direction in FIG. 4) in the rotational direction (clockwise in FIG. 4) of the rotary shaft 22 and protrudes further than the web portion 33d in the circumferential direction; a corner end portion 35b that constitutes an end opposite to the projecting end portion 35a in the circumferential direction, and a connecting portion 35c connecting between the corner end portion 35b and the projecting end portion 35a. The arc surface 33a' is an example of an implementation configuration corresponding to the "inclined surface" and the "arc surface" in the present invention. In addition, the projecting end portion 35a, the corner end portion 35b, and the connecting portion 35c are an example of an implementation configuration corresponding to the "first lifting part", the "second lifting part" and the "assisting part", respectively, of the present invention.

At the start of the operation of the veneer sheet conveying apparatus 1, as shown in FIG. 2, the sorting apparatus 20 is at rest at a position where the guiding member 24, specifically, the rim portion 33a (arc surface 33a') of the guiding plates 32a and 32b face downward, that is, opposite to the piercing-conveying conveyor 8. At this position, the distance (gap) between the arc surface 33a' of the guiding plates 32a and 32b and the tip of needle-like bodies 8a' is configured to be larger than the thickness of the veneer 10. Hereinafter, this position is defined as a "standby position." The state in which the guiding member 24 is at the standby position is an example of an implementation configuration corresponding to the "non-guiding state" in the present invention. Note that, as illustrated in FIG. 5, among the sorting apparatus 20 disposed in the arrangement direction (left and right direction in FIG. 5), the sorting apparatus 20 at both ends are disposed such that the guiding member 24 thereof is located directly under the piercing-conveying conveyor 8. More specifically, as illustrated in FIG. 3, the sorting apparatus 20 at both ends are disposed so that the gap between the pair of guiding plates 32a and 32b is located directly under the needle-like bodies 8a' of the piercing-conveying conveyor 8 to be described later.

As illustrated in FIG. 3, the push-up member 26 includes a rolling bearing 26a and a boss member 26b that fixes the rolling bearing 26a to the rotary shaft 22. The boss member 26b is formed with an axial hole 26b' having an axial center 26bc at a position offset with respect to an axial center 26ac of the inner ring of the rolling bearing 26a. With this configuration, the rolling bearing 26a is fixed in a state of being eccentric with respect to the rotary shaft 22, specifically, in a state of being offset to the side where the rim portion 33a of the guiding plate 32a is arranged with respect to the rotary shaft 22. Furthermore, the offset amount of the rolling bearing 26a is configured so as to be maximum at a position corresponding to approximately the central part in the circumferential direction of the connecting portion 35c of the rim portion 33a (refer to FIG. 4). In the present invention, the push-up member 26 is an example of the implementation configuration corresponding to the "push-up section" in the present invention, and the rolling bearing 26a is an example of the implementation configuration corresponding to the "second rotating member" in the present invention.

The push-up member 26 thus constructed is configured to abut against the back surface of the belts 7a, 7b, and 7c (only the belt 7c is illustrated in FIG. 3) when rotated with the rotation of the rotary shaft 22, thereby pushing up the belts 7a, 7b, and 7c (only the belt 7c is illustrated in FIG. 3) from under (the lower side in FIG. 3) as illustrated in FIG. 3. The amount of the belts 7a, 7b, and 7c being pushed up by the push-up member 26 (rolling bearing 26a) is maximum at a position corresponding to approximately the central part in the circumferential direction of the connecting portion 35c of the rim portion 33a.

As illustrated in FIG. 2, the piercing-conveying conveyor 8 is disposed above the discharging conveyor 7 and includes a belt body 8a having a plurality of needle-like bodies 8a', a deflection suppressing pulley 8b for suppressing the deflection of the belt body 8a, a swinging needle removal claw 8c, and a fixed needle removal claw 8d. The piercing-conveying conveyor 8 is an example of an implementation configuration corresponding to the "piercing and conveying unit" in the present invention.

The deflection suppressing pulley 8b is configured as a roller member. In the present embodiment, as illustrated in FIG. 5, a configuration is adopted in which two belt bodies 8a are arranged in a direction (left and right direction in FIG. 5) orthogonal to the conveying direction (direction from the front to the far side of FIG. 5). The pair of belt bodies 8a is disposed at a position corresponding to the upper side of the guiding member 24 of the sorting apparatus 20 disposed on both sides out of the three sorting apparatus 20. Further, the needle-like bodies 8a' has a falling preventing portion 18 where a veneer 10 (product veneer 12) is caught rendering the veneer 10 (product veneer 12) not to fall off therefrom by its own weight when the veneer 10 (product veneer 12) is pierced by the needle-like bodies 8a' (refer to FIG. 3). As illustrated in FIG. 4, note that the deflection suppression pulley 8b is installed on the piercing-conveying conveyor 8 so that the center of the deflection suppressing pulley 8b is disposed on a straight line VL which passes through the rotation axis center of the rotary shaft 22.

The controller 80 is configured as a microprocessor with a central CPU, and includes, in addition to the CPU, a ROM that stores processing programs, a RAM that stores data temporarily, and an input/output port and a communication port. The controller 80 receives signals such as veneer shape detection signals from the veneer shape detection sensors 62 (62a, 62b, 62c, 62d, 62e, 62o, cutting signals from the cutting detection sensor 64, pulse signals from the pulse generators 6a and 7d, and the driving state of the motor 23, and those signals are inputted through the input port. In addition, drive signals from the controller 80 to the cutting device 4, the loading conveyor 6, the discharging conveyor 7, the swinging needle removal claw 8c, and the motor 23 are outputted through the output port.

Next, an operation of the veneer sheet conveying apparatus 1 thus configured, in particular, an operation of the sorting apparatus 20 at the time of sorting the veneer 10 continuously conveyed out by the discharging conveyor 7 into the product veneer 12 and the trash veneer 14 will be described. In the veneer sheet conveying apparatus 1 according to an exemplary embodiment of the present invention, the veneer 10 peeled from the raw wood L by the rotary lathe 2 are conveyed to the cutting device 4 by the loading conveyor 6, and then conveyed to the sorting apparatus 20 by the discharging conveyor 7 after being cut into the product veneer 12 and trash veneer 14 by the cutting device 4. Then, the veneer 10 are sorted into the product veneer 12 and the trash veneer 14 by the sorting apparatus 20, and thereafter only the product veneer 12 are conveyed to the transport conveyors 72 and 74 by the piercing-conveying conveyor 8 whereas the trash veneer 14 are transported from the discharging conveyor 7 to the trash conveyor 76. The product veneer 12 conveyed to the transport conveyors 72 and 74 are stacked in corresponding deposition boxes 72a and 74a, respectively. The trash veneer 14 conveyed to the trash conveyor 76 are deposited in a deposition box not shown in the drawing.

FIG. 7 is a flowchart illustrating an example of a main control process routine executed by the CPU of the controller 80. This process is performed when the veneer sheet conveying apparatus 1 is powered on. When the main control process routine is executed, the following processes are repeatedly executed: a boundary setting process (S10) exemplified in FIGS. 8 and 9, a cutting process (S20) exemplified in FIG. 10; a distribution process (S30) exemplified in FIG. 11; and a sorting process (S40) exemplified in FIG. 12. The boundary setting process is a process repeatedly executed when the veneer 10 peeled by the rotary lathe 2 are conveyed to the cutting device 4 by the loading conveyor 6, and the cutting process is a process that is repeatedly executed when the veneer 10 are cut by the cutting device 4. The distribution process is a process repeatedly executed when the veneer 10 cut by the cutting device 4 and continuously conveyed out by the discharging conveyor 7 are separated into the product veneer 12 and the trash veneer 14 by the sorting apparatus 20. The sorting process is a process that is repeatedly executed when the product veneer 12 conveyed by the piercing-conveying conveyor 8 are sorted into standard-length veneer 12a and short end veneer 12b. Each process is described below.

Figure 8:
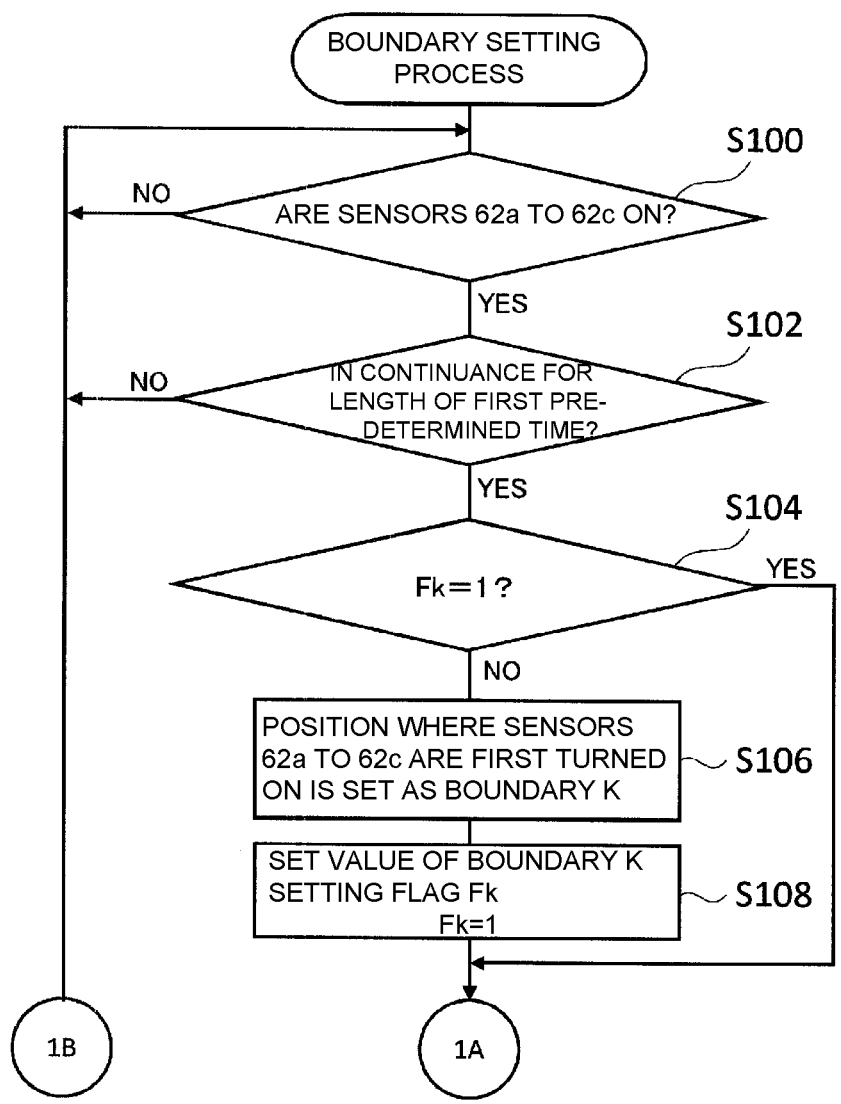
FIG. 8 is a flowchart illustrating an example of a boundary setting process routine executed by the controller 80 of the veneer conveying apparatus 1 that includes the sorting apparatus 20 according to an embodiment of the present invention.
Figure 9:
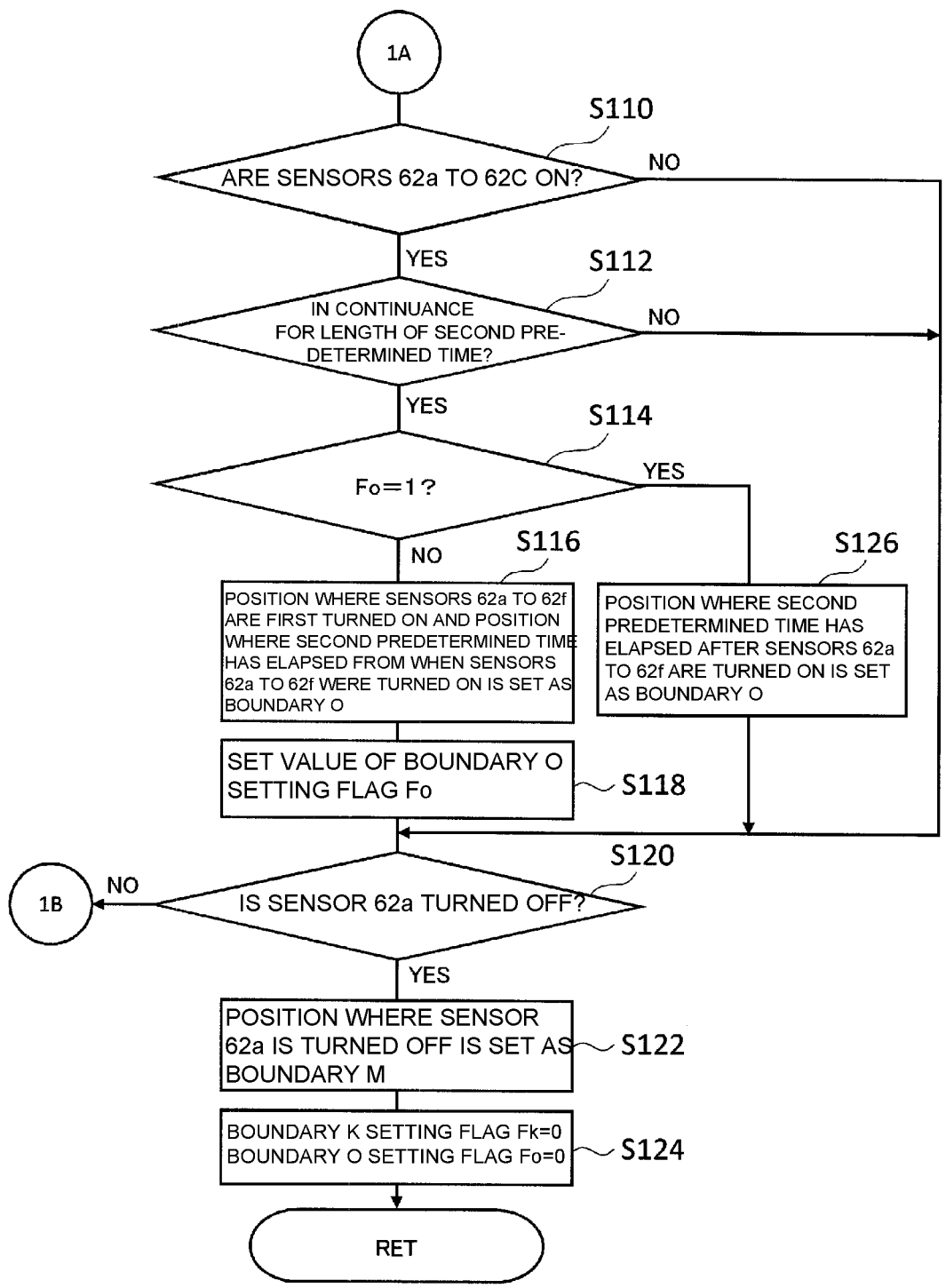
FIG. 9 is a flowchart of a portion branched from the boundary setting process routine.

In the boundary setting process routine, as illustrated in FIG. 8 and FIG. 9, the CPU of the controller 80 first determines whether the veneer shape detection sensors 62a to 62c are turned ON (step S100). If the veneer shape detection sensors 62a to 62c are ON, then determination is made as to whether the sensors are continuously in the ON state for the length of a first predetermined time (step S102). Here, the first predetermined time is set as a conveying time of a veneer 10 conveyed by the loading conveyor 6 that corresponds to a length dimension in which the short end veneer 12b can be procured (refer to FIG. 6). Note that the short end veneer 12b, though not meeting the defined standard dimensions, is defined as a veneer which satisfies a predetermined dimension and from which a product can be obtained.

If it is determined that the veneer shape detection sensors 62a to 62c are not turned ON in step S100, then the process of step S100 is repeatedly executed until the veneer shape detection sensors 62a to 62c are turned ON. Further, when it is determined in step S102 that the veneer shape detection sensors 62a to 62c are not continuously in the ON state for the length of first predetermined time, the process of steps S100 to S102 are repeatedly executed until the ON state of the veneer shape detection sensors 62a to 62c continues for the first predetermined time.

In step S102, when it is determined that the ON state of the veneer shape detection sensors 62a to 62c has continued for the length of the first predetermined time, then determination is made on the state of a boundary K setting flag Fk that indicates whether or not the boundary K between the upstream end portion of the trash veneer 14 and the downstream end portion of the product veneer 12 is set (step S104). Here, the boundary K setting flag Fk has a value of 1 when the boundary K is already set and the boundary M corresponding to the boundary K is not yet set, whereas when the boundary K is not yet set or when the boundary K and the boundary M corresponding to the boundary K have already been set, the boundary K setting flag Fk has a value of 0. Note that, as illustrated in FIG. 6, the boundary K is set as the boundary between the upstream end portion of the trash veneer 14 and the downstream end portion of the product veneer 12 as described above, and the boundary M is set as a boundary between the upstream end portion of the product veneer 12 and the downstream end portion of the trash veneer 14.

When the operation of the veneer sheet conveying apparatus 1 is started, the boundary K is not set and therefore the boundary K setting flag Fk is set to the value 0. On the assumption that the operation of the veneer sheet conveying apparatus 1 has now started, it is determined that the value of the boundary K setting flag Fk is 0. The position where the veneer shape detection sensors 62a to 62c are first turned ON is set as the boundary K (step S106) and the boundary K setting flag Fk is set to the value 1 (step S108), and then determination is made as to whether all the veneer shape detection sensors 62a to 62f are turned ON (step S110). Note that when the process routine is not executed for the first time and the boundary K is already set but the boundary M corresponding to the boundary K has not been set, then step S110 is performed without performing steps S106 and S108 since the boundary K setting flag Fk is set to the value of 1.

When determination is made in step S110 that the veneer shape detection sensors 62a to 62f are all ON, then the process proceeds to determine whether the sensors are continuously ON for the length of a second predetermined time (step S112). Here, the second predetermined time is set as a conveyance time of a veneer 10 conveyed by the loading conveyor 6 that corresponds to a length dimension in which the standard-length veneer 12a can be obtained (refer to FIG. 6). In addition, the standard-length veneer 12a is defined as a veneer that satisfies the standard dimension defined as a product.

When the ON state of the veneer shape detection sensors 62a to 62c continues for the second predetermined time, then determination is made on the state of a boundary O setting flag Fo that indicates whether or not the boundary O as a cutting location for acquiring the standard-length veneer 12a from among the product veneer 12 is set (step S114). Here, the boundary O setting flag Fo has a value of 1 when the boundary O is already set, and has a value of 0 when the boundary O is not yet set. In addition, as illustrated in FIG. 6, the boundary O is set as a boundary for acquiring the standard-length veneer 12a from among the product veneer 12 as described above.

When the operation of the veneer sheet conveying apparatus 1 is started, the boundary O is not set, and therefore the boundary O setting flag Fk is set to the value of 0. On the assumption that the operation of the veneer sheet conveying apparatus 1 has now started, it is determined that the value of the boundary O setting flag Fo is 0. The position where all the veneer shape detection sensors 62a to 62f are first turned ON is set as the boundary O, and the position after which the second predetermined time has elapsed is also set as the boundary O (step S116), and then the boundary O setting flag Fo is set to the value of 1 (step S118). On the other hand, when the process routine is not executed for the first time and the boundary O is already set, the position after which the second predetermined time has elapsed is set as the boundary O (step S126) because the boundary O setting flag Fo is set to the value of 1.

Subsequently, the process to determine whether the veneer shape detection sensor 62a is turned OFF is performed (step S120). When it is determined in step S110 that all the veneer shape detection sensors 62a to 62f are not turned ON, and determined in step S112 that all the veneer shape detection sensors 62a to 62f are not continuously ON for the length of the second predetermined time, the process of step S120 is immediately executed.

In step S120, when it is determined that the veneer shape detection sensor 62a is not turned OFF, that is, when it is determined that the veneer shape detection sensor 62a is still ON, the processes from step S100 to step S120 are repeatedly executed until it is determined that the veneer shape detection sensor 62a is turned OFF.

On the other hand, when it is determined that the veneer shape detection sensor 62a is turned OFF, the position where the veneer shape detection sensor 62a is turned OFF is set as the boundary M (step S122), and thereafter the boundary K setting flag Fk and the boundary O setting flag Fo are both set to the value of 0 (step S124), and the process routine is terminated. Accordingly, as illustrated in FIG. 6, boundaries K, O, and M are set on the veneer 10 peeled by the rotary lathe 2. It is to be noted that the set boundaries K, O, and M are stored in a predetermined area of the RAM of the controller 80.

Figure 10:
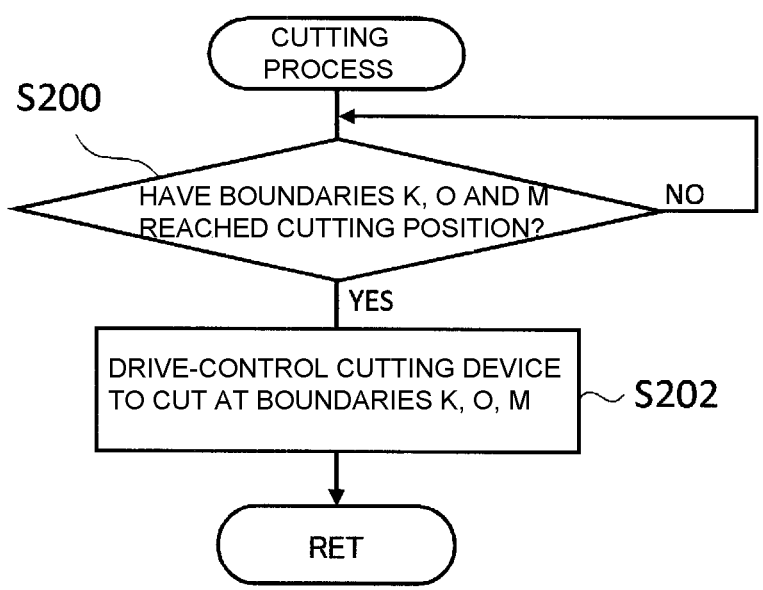
FIG. 10 is a flowchart illustrating an example of a cutting process routine executed by the controller 80 of the veneer conveying apparatus 1 that includes the sorting apparatus 20 according to an embodiment of the present invention.

The cutting process routine is described next. In the cutting process routine, as illustrated in FIG. 10, the CPU of the controller 80 first determines whether boundaries K, O and M have reached the cutting position according to the cutting device 4 (step S200). Here, since it takes time to reach the state where the cutting edge of the rotary blade 4a bites into the anvil roll 4c after the driving of the cutting device 4 has been started (until the cutting edge comes to a position where it bites into anvil roll 4c (hereinafter referred to as "cutting edge position")), the cutting position is set upstream than the cutting edge position by only a distance in which the veneer 10 (product veneer 12 and trash veneer 14) are conveyed during the time required for the cutting edge of the rotary blade 4a to bite into the anvil roll 4c (until the rotary blade 4a reaches to the cutting edge position) after the driving of the cutting device 4 has been started. In the present exemplary embodiment, a configuration thereof to determine if the respective boundaries K, O, and M have reached the cutting position is performed by obtaining the amount of movement of each boundaries K, O, and M (conveyance number of the veneer 10) from the point where the veneer shape detection sensor 62 (62a, 62b, 62c, 62d, 62e, 62f), which has become the base point where the boundaries K, O, and M are set by the boundary setting process routine, is turned ON or OFF and determining whether or not the amount of movement of each boundaries K, O, and M (conveyance number of the veneer 10) is equal to the distance from the veneer shape detection sensor 62 (62a, 62b, 62c, 62d, 62e, 62f) to the cutting position.

If it is determined that the boundaries K, O, and M have reached the cutting position, the cutting device 4 is drive-controlled to cut at the boundaries K, O, and M (step S202), and the process exits the process routine. A cutting signal is output from the cutting detection sensor 64 at the instant when the veneer 10 is cut at the boundaries K, O, and M. Accordingly, the veneer 10 are each cut at the boundaries K, O, and M set in the above-described boundary setting process routine, whereby the veneer 10 are each separated into a plurality of product veneer 12 and trash veneer 14 (refer to FIG. 6). Further, the veneer 10 cut into the plurality of product veneer 12 and the trash veneer 14 are continuously discharged to the discharging conveyor 7.

Here, in the present exemplary embodiment, the conveying speed of the discharging conveyor 7 for conveying the veneer 10 discharged from the cutting device 4 is set to a speed slightly higher than the conveying speed of the loading conveyor 6 for conveying the veneer 10 into the cutting device 4. With this configuration, the conveying-out amount per unit time of the veneer 10 after cutting (the product veneer 12 or the trash veneer 14) located on the downstream across the cutting device 4 becomes greater than the veneer 10 located on the upstream side across the cutting device 4 before cutting, and as a result, predetermined gaps G (refer to FIG. 13) are set at boundaries K, O, and M.

On the other hand, when it is determined in step S200 that the boundaries K, O, and M have not reached the cutting position, the process of step S200 is repeatedly executed until the boundaries K, O, and M reach the cutting position. In this way, the veneer 10 peeled by the rotary lathe 2 are cut into the product veneer 12 and the trash veneer 14.

Figure 11:
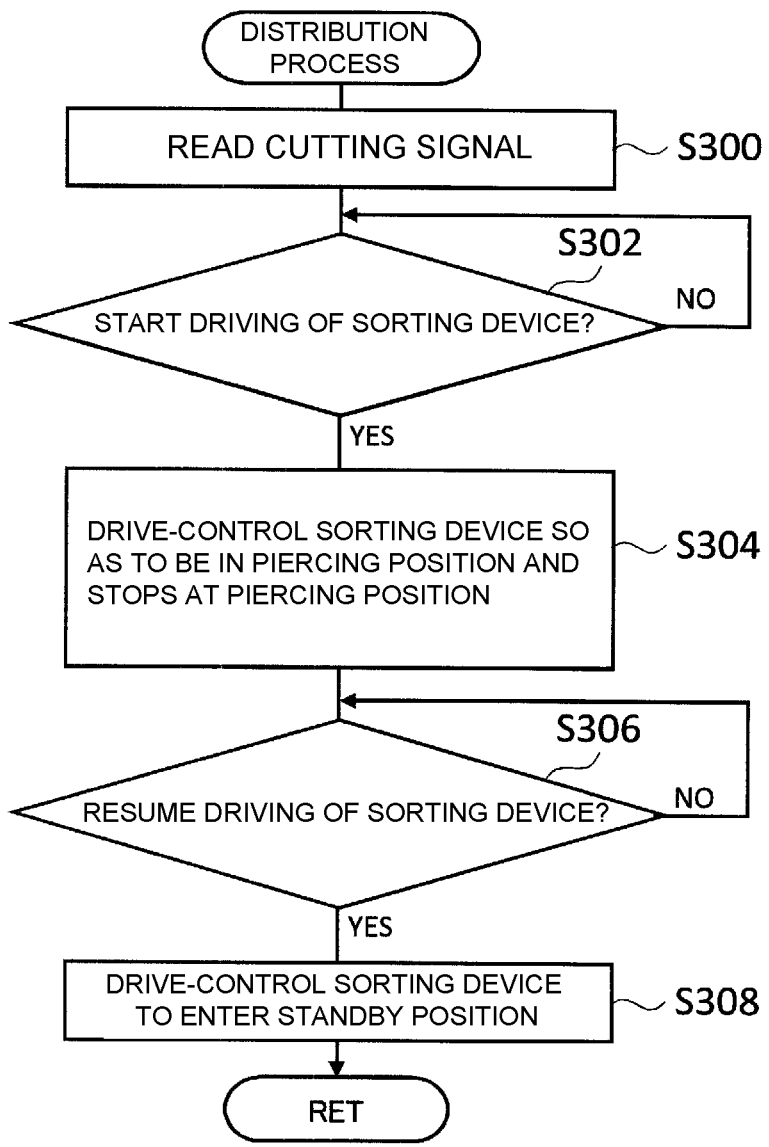
FIG. 11 is a flowchart illustrating an example of a distribution process routine executed by the controller 80 of the veneer conveying apparatus 1 that includes the sorting apparatus 20 according to an embodiment of the present invention.

Next, the distribution process routine is described. In the distribution process routine, as illustrated in FIG. 11, the CPU of the controller 80 first reads the cutting signal from the cutting detection sensor 64 (step S300) and determines whether to start the driving of the sorting apparatus 20 or not (step S302). In the present exemplary embodiment, the determination of whether to start the driving of the sorting apparatus 20 or not is configured to be performed by determining whether the boundary K has reached a predetermined position based on the read cutting signal, that is, by obtaining the travel distance of the boundary K from the time the cutting signal is transmitted when the boundary K is cut to thereby determine whether the travel distance is equal to the distance from the cutting edge position (cutting detection sensor 64) to the predetermined position.

Figure 13:
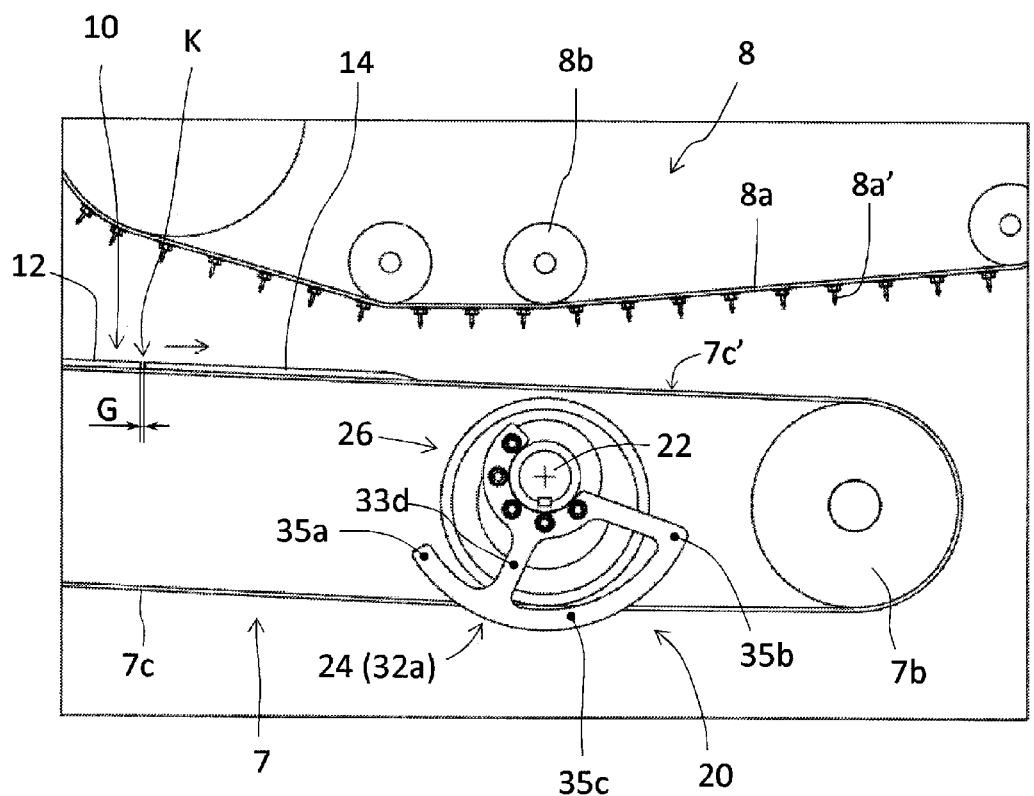
FIG. 13 is an explanatory diagram illustrating a state in which the sorting apparatus 20 according to an embodiment of the present invention is at a standby position.
Figure 14:
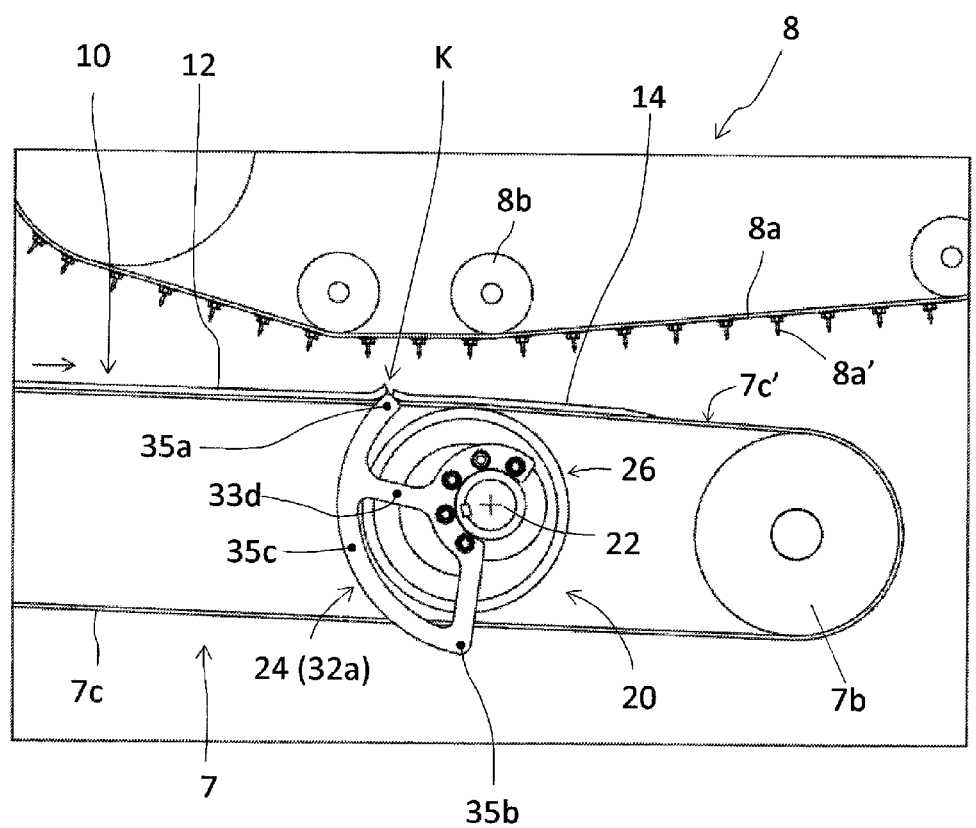
FIG. 14 is an explanatory diagram illustrating a state where the sorting apparatus 20 according to an embodiment of the present invention begins to lift the downstream end portion of a product veneer 12.

Here, the driving of the sorting apparatus 20 is started and time is required for the sorting apparatus 20 to reach the lifting start position illustrated in FIG. 14 from the standby position illustrated in FIG. 13, and therefore the predetermined position is set upstream than the lifting start position by only a distance in which the veneer 10 (the product veneer 12) is conveyed during the time required for the projecting end portion 35a to reach the lifting start position from the standby position. Note that the term "lifting start position" is defined as the position at which the projecting end portion 35a of the guiding member 24 of the sorting apparatus 20 abuts against the boundary K as illustrated in FIG. 14, that is, the position where the projecting end portion 35a starts raising the downstream end portion of the product veneer 12.

Figure 16:
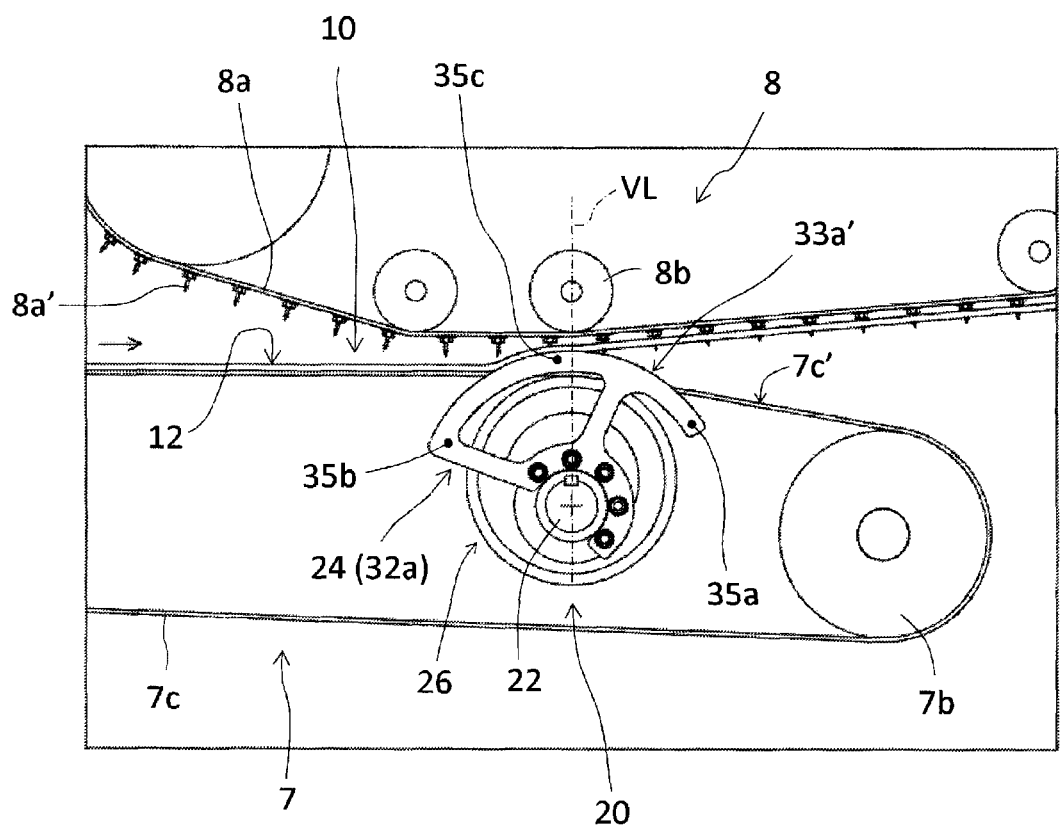
FIG. 16 is an explanatory diagram illustrating a state in which the sorting apparatus 20 according to an embodiment of the present invention is in a piercing position.

Then, when it is determined in step 302 not to start the drive of the sorting apparatus 20, then the process of step S302 is repeatedly executed until it is determined that the drive of the sorting apparatus 20 is started. On the other hand, when it is determined in step 302 to start the drive of the sorting apparatus 20, the sorting apparatus 20 is drive-controlled so that the guiding member 24 is in the piercing position and that the guiding member 24 stops at the piercing position (step S304). Specifically, the motor 23 is drive-controlled to control the sorting apparatus 20. As illustrated in FIG. 16, in this exemplary embodiment, the term "piercing position" is defined as approximately the central part in the circumferential direction of the connecting portion 35c (arc surface 33a') of the guiding member 24 on a straight line VL connecting the rotation axis center of the rotary shaft 22 and the center of the deflection suppressing pulley 8b, and a position where approximately the central part in the circumferential direction (arc surface 33a') of the connecting portion 35c is closest to the belt body 8a of the piercing-conveying conveyor 8. The distance between the arc surface 33a' of the guiding member 34 and the tip of the needle-like bodies 8a' on the straight line VL is smaller than the thickness of the veneer 10 at the "piercing position." More specifically, the tip of the needle-like bodies 8a' on the straight line VL is configured to be disposed lower than the arc surface 33a' as illustrated in FIG. 3. The state in which the guiding member 24 is in the piercing position is an example of the implementation configuration corresponding to the "guiding state" in the present invention.

Figure 15:
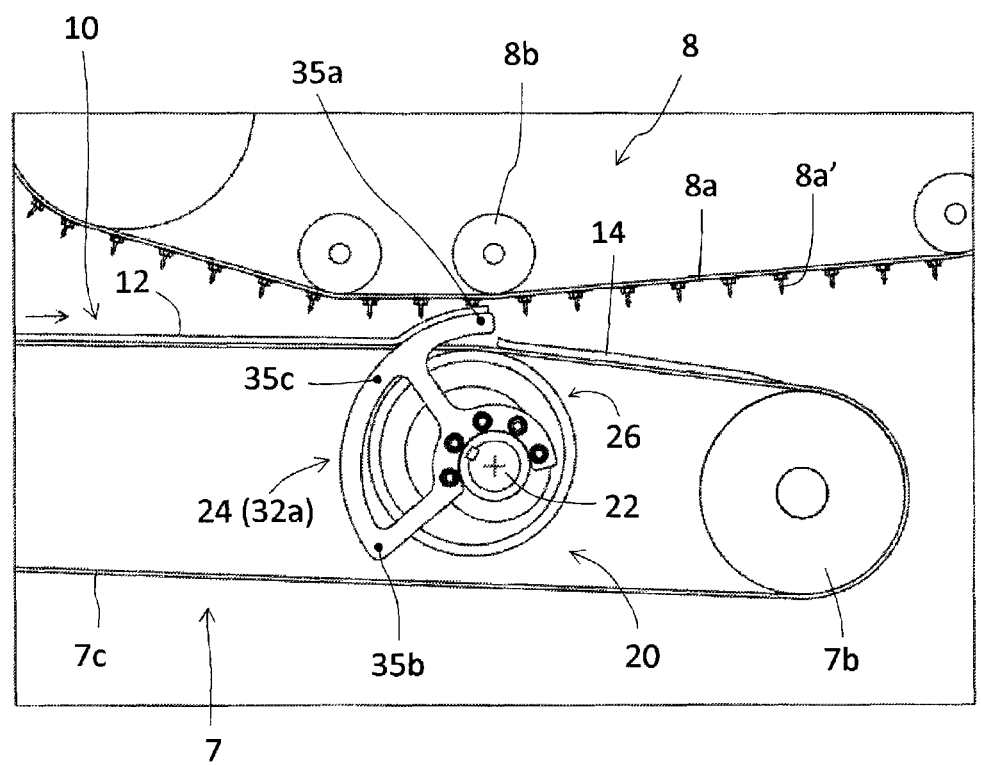
FIG. 15 is an explanatory diagram illustrating a state in which needle-like bodies 8a' is pierced into a downstream end portion of the product veneer 12.

Further, when the driving toward the piercing position of the guiding member 24 is started, the push-up of the belts 7a, 7b, and 7c (only the belt 7c is illustrated in FIG. 15) of the discharging conveyor 7 by the push-up member 26 toward the piercing-conveying conveyor 8 is also started. Then, when the guiding member 24 is in the piercing position, the push-up of the belts 7a, 7b, and 7c (only the belt 7c is shown in FIG. 15) of the discharging conveyor 7 by the push-up member 26 toward the piercing-conveying 8 is maximized.

In the present exemplary embodiment, the sorting apparatus 20 is configured to be controlled to operate at a rotating speed that can guide the product veneer 12 toward the piercing-conveying conveyor 8 at substantially the same speed as the conveying speed of the veneer 10 conveyed by the discharging conveyor 7 at least by the time when the sorting apparatus 20 reaches the lifting start position. The configuration in which the tip of the needle-like bodies 8a' located on the straight line VL at the "piercing position" is disposed lower than the arc surface 33a' is an example of an implementation configuration corresponding to "the distance between the action section and the needle-like bodies are configured to be smaller than the thickness of the veneer" in the present invention. In addition, the piercing position is an example of an implementation configuration corresponding to the "assisting state" in the present invention.

Thus, when the guiding member 24 of the sorting apparatus 20 is rotated to the piercing position and stopped in this state, determination whether to resume the driving of the sorting apparatus 20 or not is executed (step S306). In the present exemplary embodiment, the determination of whether to resume the driving of the sorting apparatus 20 or not is configured to be performed by determining whether the boundary M has reached a second predetermined position based on the read cutting signal, that is, by obtaining the travel distance of the boundary M from the time the cutting signal is transmitted when the boundary M is cut to thereby determine whether the travel distance is equal to the distance from the cutting edge position (cutting detection sensor 64) to the second predetermined position.

Figure 17:
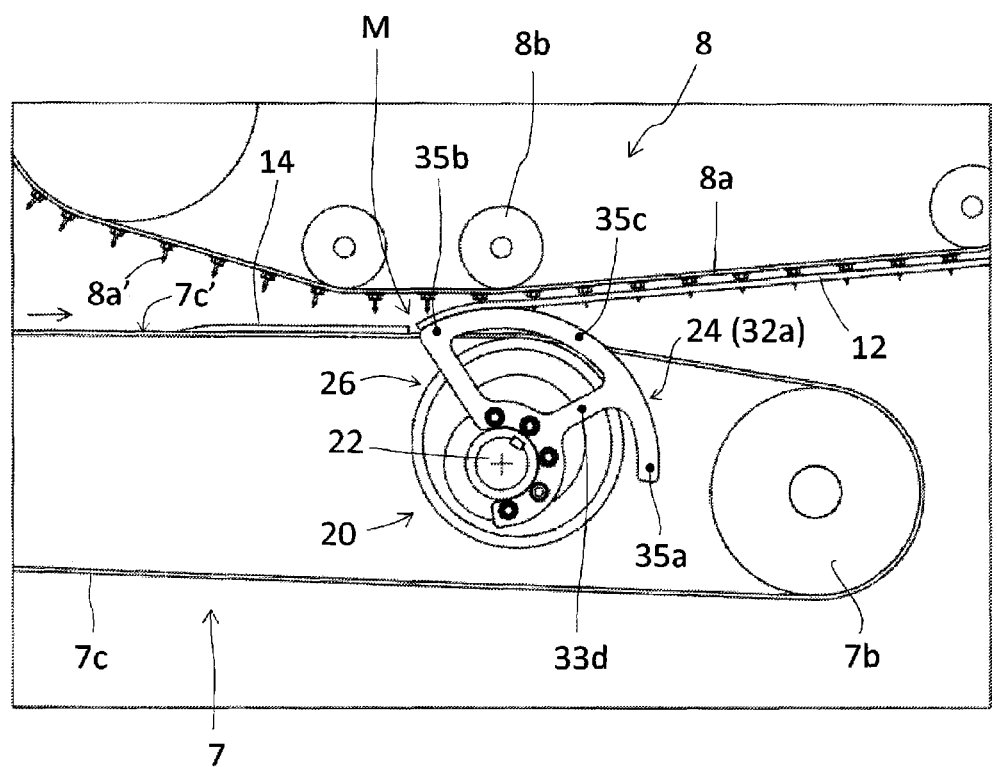
FIG. 17 is an explanatory diagram illustrating a state in which an upstream end portion of the product veneer 12 is lifted by the sorting apparatus 20 according to an embodiment of the present invention.

Here, the sorting apparatus 20 requires time to reach the lifting end position illustrated in FIG. 17 from the piercing position illustrated in FIG. 16, and therefore the second predetermined position is set upstream than the lifting end position by only a distance in which the veneer 10 (product veneer 12) is conveyed during the time required for the corner end portion 35b to reach the lifting end position from the piercing position. Note that the term "lifting end position" is defined as the position at which the corner end portion 35b of the guiding member 24 of the sorting apparatus 20 abuts against the boundary M as illustrated in FIG. 17, that is, the position where the corner end portion 35b stops raising the upstream end portion of the product veneer 12.

Then, when it is determined in step 306 that the drive of the sorting apparatus 20 is to be resumed, the sorting apparatus 20 is driven so that the guiding member 24 of the sorting apparatus 20 is at the standby position, specifically, by drive-controlling the motor 23 (step S308), and the process exits the process routine. On the other hand, when it is determined in step 306 that the drive of the sorting apparatus 20 is not to be resumed, the process of step S306 is repeatedly executed until it is determined that the drive of the sorting apparatus 20 is resumed. The distribution process routine executed by the controller 80 is an example of an implementation configuration corresponding to "the sorting apparatus is drive-controlled based on a signal" in the present invention.

Figure 12:
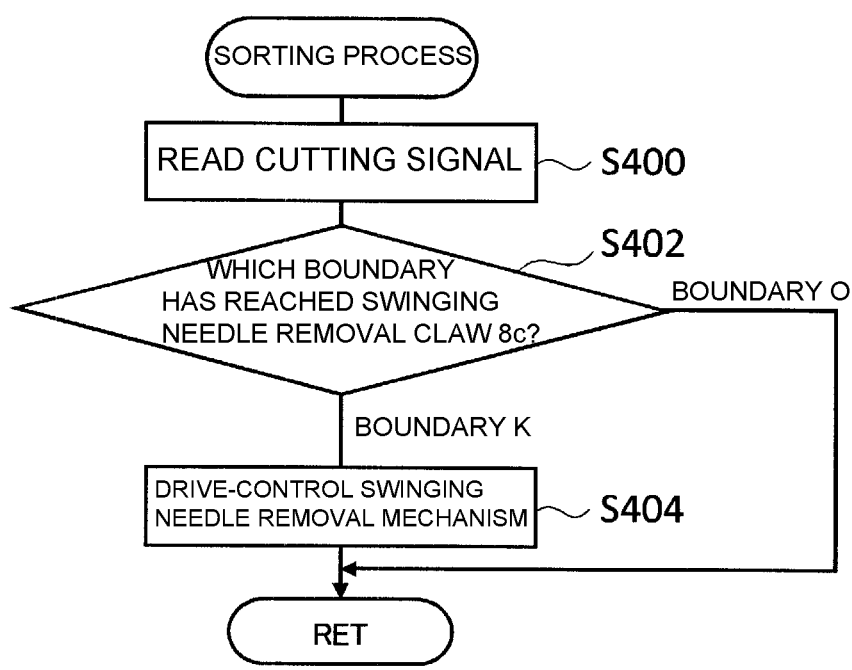
FIG. 12 is a flowchart illustrating an example of a sorting process routine executed by the controller 80 of the veneer conveying apparatus 1 that includes the sorting apparatus 20 according to an embodiment of the present invention.

Next, the sorting process routine is described. In the sorting process routine, as illustrated in FIG. 12, the CPU of the controller 80 first reads the cutting signal from the cutting detection sensor 64 (step S400), and determines whether the boundary that has reached the swinging needle removal claw 8c is the boundary K or the boundary O (step S402). When the controller 80 has determined that the boundary is boundary K, then assuming that the veneer 10 conveyed by the piercing-conveying conveyor 8 is the short end veneer 12b, the swinging needle removal claw 8c is drive-controlled so as to release (pull out the needle) the short end veneer 12b on the transport conveyor 72 (step S404), and the process exits the process routine. On the other hand, when it is determined in step S402 that the boundary is boundary O, then assuming that the veneer 10 conveyed by the piercing-conveying conveyor 8 is the standard-length veneer 12a, the process exits the process routine without driving the swing needle removal claw 8c so as not to pull out the needle from the standard-length veneer 12a on the transport conveyor 72. The product veneer 12 conveyed by the piercing-conveying conveyor 8 are thus sorted into the standard-length veneer 12a and the short end veneer 12b.

FIGS. 13 to 19 are explanatory views illustrating, in time series, how the veneer 10 are separated into the product veneer 12 and the trash veneer 14 by the sorting apparatus 20. As illustrated in FIG. 13, the sorting apparatus 20 remains at the standby position until the boundary K of each of the veneer 10 cut into at least a product veneer 12 and a trash veneer 14 by the cutting device 4 and continuously discharged by the discharging conveyor 7 reaches a predetermined position on the discharging conveyor 7 (step S300, step S302).

Then, when the boundary K of the veneer 10 reaches the predetermined position on the discharging conveyor 7, drive control is performed until the sorting apparatus 20 reaches the piercing position (step S304). Specifically, the guiding member 24 and the push-up member 26 are rotated together with the rotary shaft 22. With this configuration, as illustrated in FIG. 14, the sorting apparatus 20 first reaches the lifting start position, and then the projecting end portion 35a of the guiding member 24 abuts on the boundary K of the veneer 10 to start the lifting of the downstream end portion of the product veneer 12.

Here, the predetermined gap G is set at the boundary K of the veneer 10 conveyed by the discharging conveyor 7, which allows the projecting end portion 35a of the guiding member 24 to reliably abut (insert) on the boundary K. Therefore, only the product veneer 12 can be reliably lifted. Since the projecting end portion 35a is configured to have a shape that protrudes further than the web portion 33d in the circumferential direction, the abutment (insertion) of the projecting end portion 35a with the boundary K can be made more reliable.

After the projecting end portion 35a of the guiding member 24 lifts the downstream end portion of each of the product veneer 12, the guiding member 24 and the push-up member 26 are further rotated together with the rotary shaft 22. As illustrated in FIG. 15, the connecting portion 35c starts to guide the product veneer 12 lifted by the projecting end portion 35a of the guiding member 24 toward the piercing-conveying conveyor 8 to start the piercing of the needle-like bodies 8a' into the product veneer 12, and the push-up member 26 (rolling bearing 26a) also begins pushing up the belts 7a, 7b, and 7c (only the belt 7c is illustrated in FIG. 15) of the discharging conveyor 7 toward the piercing-conveying conveyor 8.

In the present exemplary embodiment, the sorting apparatus 20 is configured to be drive-controlled to operate at a rotating speed that can guide the product veneer 12 toward the piercing-conveying conveyor 8 at substantially the same speed as the conveying speed of the veneer 10 conveyed by the discharging conveyor 7 by the time when the sorting apparatus 20 reaches the lifting start position. Therefore, the downstream end portions of the product veneer 12 will not pass the guiding member 24 and the guiding member 24 will not collide with the upstream end portions of the trash veneer 14. With this configuration, guiding the product veneer 12 toward the piercing-conveying conveyor 8 can be stabilized.

Then, when the sorting apparatus 20 drive-controlled to this rotational speed reaches the piercing position as illustrated in FIG. 16, the drive of the sorting apparatus 20 is stopped at the piercing position until the boundary M of the veneer 10 continuously discharged by the discharging conveyor 7 reaches the second predetermined position on the discharging conveyor 7 (step S304). As described above, the sorting apparatus 20 is stopped at the piercing position, and at any one time the product veneer 12 continuously conveyed by the discharging conveyor 7 pass through a clearance narrower than the thickness dimension of the product veneer 12 located between the arc surface 33a' of the guiding member 24 and the tip of the needle-like bodies 8a', that is, the position where the tip of the needle-like bodies 8a' protrudes below the arc surface 33a' of the guiding member 24. Thus, the needle-like bodies 8a' can reliably pierce into the product veneer 12 while the piercing thereof can be stabilized as well.

When the sorting apparatus 20 is in the piercing position, the extent of the belts 7a, 7b and 7c (only the belt 7c is illustrated in FIG. 16) of the discharging conveyor 7 pushed up by the push-up member 26 (rolling bearing 26a) toward the piercing-conveying conveyor 8 is at the maximum, and thus allowing the product veneer 12 to be passed at a smooth angle from the mounting surfaces 7a', 7b', and 7c' (only the mounting surface 7c' is illustrated in FIG. 16) of the belts 7a, 7b, and 7c (only the belt 7c is illustrated in FIG. 16) to the arc surface 33a' of the guiding member 24. As a result, buckling of the product veneer 12 when lifted by the guiding member 24 is satisfactorily decreased, whereby jamming of veneers during conveyance can be prevented.

Then, when the boundary M of the veneer 10 continuously discharged by the discharging conveyor 7 arrives at the second predetermined position on the discharging conveyor 7, driving of the sorting apparatus 20 is resumed toward the standby position (steps S306 and S308), and as illustrated in FIG. 17, when the sorting apparatus 20 reaches the lifting end position, the lifting of the upstream end portion of the product veneer 12 by the corner end portion 35b of the guiding member 24 is completed.

The predetermined gap G is set at the boundary M of the product veneer 12 conveyed by the discharging conveyor 7 as with the boundary K making it possible for the corner end portion 35b of the guiding member 24 to reliably lift only the upstream end portion of the product veneer 12.

Further, in the present exemplary embodiment, the sorting apparatus 20 is drive-controlled to operate at the rotating speed that can guide the product veneer 12 toward the piercing-conveying conveyor 8, the speed being substantially the same speed as the conveying speed of the veneer 10 conveyed by the discharging conveyor 7, after the sorting apparatus 20 reaches the lifting end position as described above. Therefore, the guiding member 24 (the corner end portion 35b) will not pass the upstream end portions of the product veneer 12, and the downstream ends portion of the trash veneer 14 will not collide with the guiding member 24. With this configuration, guiding the product veneer 12 toward the piercing-conveying conveyor 8 can be stabilized.

Figure 18:
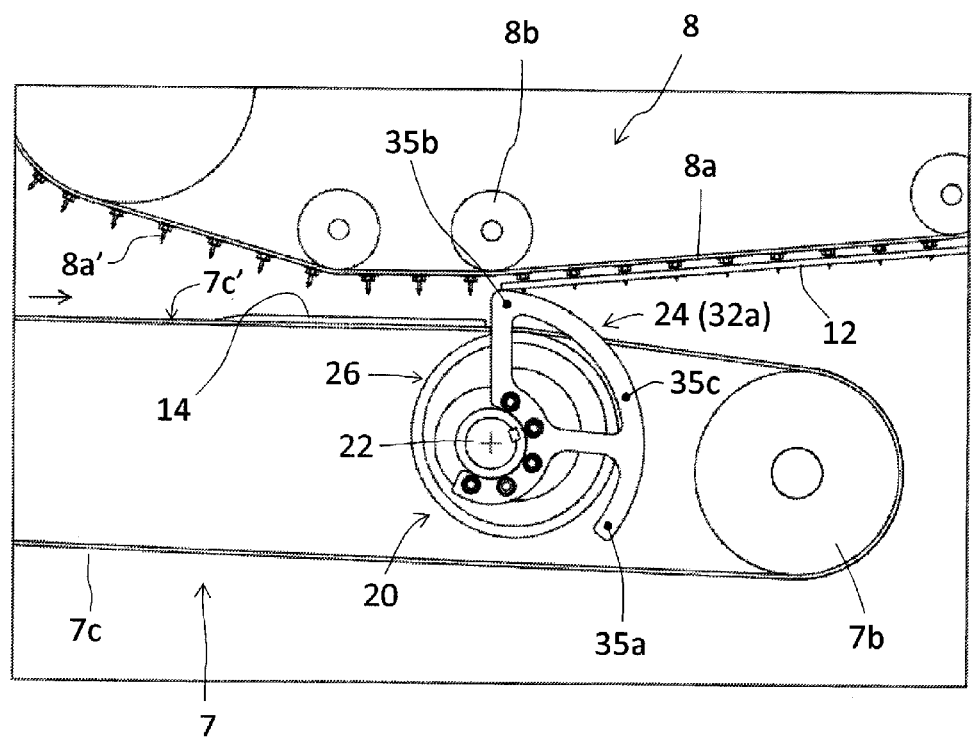
FIG. 18 is an explanatory diagram illustrating a state in which the needle-like bodies 8a' is pierced into the upstream end portion of the product veneer 12.
Figure 19:
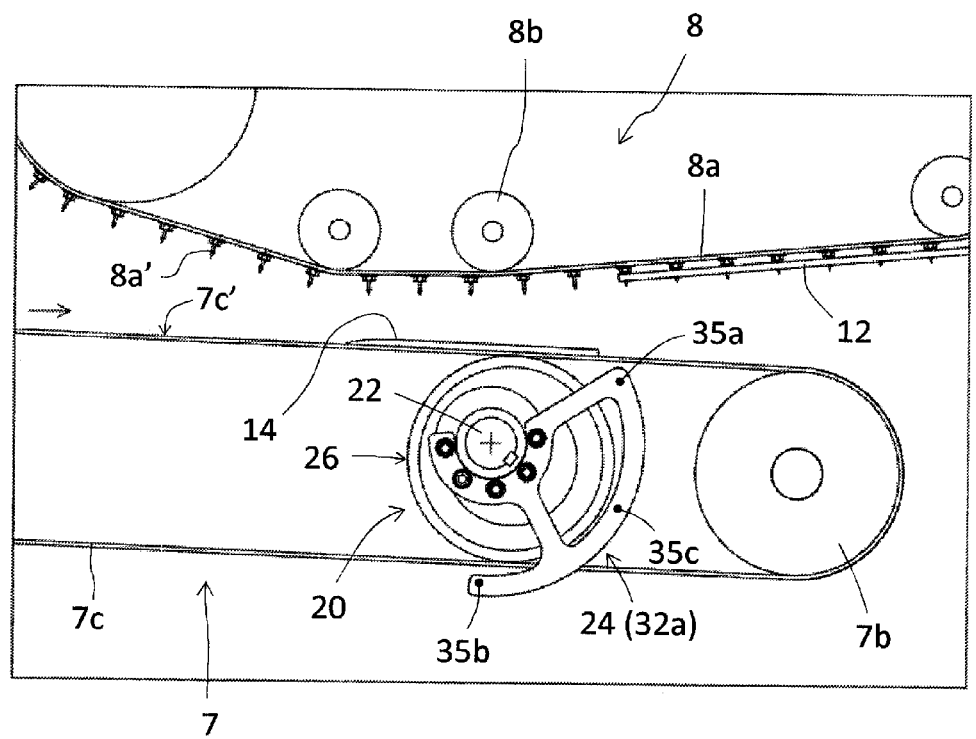
FIG. 19 is an explanatory diagram illustrating a state in which the sorting apparatus 20 according to an embodiment of the present invention is in the process of being turned toward the standby position.

After the corner end portion 35b of the guiding member 24 lifts the upstream end portion of the product veneer 12, the guiding member 24 and the push-up member 26 are further rotated together with the rotary shaft 22. As illustrated in FIG. 18, the sorting apparatus 20 reliably guides the upstream end portion of the product veneer 12 to the piercing-conveying conveyor 8 by means of the corner end portion 35b of the guiding member 24 and also reliably assist the piercing of the needle-like bodies 8a' to the upstream end of portion the product veneer 12. Thereafter, as illustrated in FIG. 19, sorting apparatus 20 is driven toward the standby position (step S308). At the standby position, the arc surface 33a' of the guiding member 24 faces the opposite direction to the piercing-conveying conveyor 8, and the distance (clearance) between the arc surface 33a' of the guiding member 24 and the tip of the needle-like bodies 8a' is larger than the thickness of the veneer 10. Thus, at the standby position, the guiding member 24 does not guide the veneer 10 toward the piercing-conveying conveyor 8; hence the trash veneer 14 on the upstream side of the product veneer 12 can be reliably conveyed toward the trash conveyor 76 disposed at the downstream end of the discharging conveyor 7 without being guided toward the piercing-conveying conveyor 8.

In the present exemplary embodiment, the part of the guiding member 24 on which receives and guides the product veneer 12 to the piercing-conveying conveyor 8 and which also assists the piercing of the needle-like bodies 8a' is located on the arc surface 33a' centered on the rotary shaft 22. Therefore, the piercing state of the needle-like bodies 8a' with respect to the product veneer 12, that is, the depth of penetration can be maintained constant irrespective of the rotational position of the guiding member 24. Thereby, conveyance of the product veneer 12 by the piercing-conveying conveyor 8 can be made more stable.

In addition, when the guide member 24 is driven toward the standby position, the extent of the belts 7a, 7b, and 7c (only the belt 7c is illustrated in FIGS. 17 to 19) of the discharging conveyor 7 pushed up by the push-up member 26 (rolling bearing 26a) toward the piercing-conveying conveyor 8 is gradually reduced, and the distance between the mounting surfaces 7a', 7b', and 7c' (only the belt 7c' is illustrated in FIGS. 17 to 19) of the belts 7a, 7b, and 7c (only the belt 7c is illustrated in FIGS. 17 to 19) and the piercing-conveying conveyor 8 (needle-like bodies 8a') gradually increases. Therefore, the trash veneer 14 on the upstream side of the product veneer 12 across the boundary M can be satisfactorily decreased from being directed to the piercing-conveying conveyor 8, but can be reliably conveyed to the trash conveyor 76 disposed at the downstream end of the discharging conveyor 7.

According to the sorting apparatus 20 of the exemplary embodiment of the present invention described above, when the veneer 10 conveyed out by the discharging conveyor 7 is the product veneer 12, the product veneer 12 is guided by the guiding member 24 and the push-up member 26 (rolling bearing 26a) toward the piercing-conveying conveyor 8 so as to be pierced by the needle-like bodies 8a', whereas when the veneer 10 conveyed out by the discharging conveyor 7 is the trash veneer 14, the trash veneer is not directed toward the piercing-conveying conveyor 8 so as not to be pierced by the needle-like bodies 8a'. Due to the sorting apparatus 20 configured as such, the progress of the abrasion of the needle-like bodies 8a' can be delayed as compared with the configuration in which the product veneer 12 and the trash veneer 14 are both pierced by the needle-like bodies 8a'. As a result, the time to replace the needle-like bodies 8a' can be extended, whereby the running cost can be reduced.

Further, according to the sorting apparatus 20 of the exemplary embodiment of the present invention, the sorting apparatus 20 is configured such that when the guiding member 24 is in the piercing position, the product veneer 12 inevitably passes through the clearance narrower than the thickness dimension of the product veneer 12 formed between the arc surface 33a' of the guiding member 24 and the tip of the needle-like bodies 8a', that is, the position where the tip of the needle-like bodies 8a' protrudes below the arc surface 33a' of the guiding member 24. Thus, the needle-like bodies 8a' can reliably pierce into the product veneer 12 while the piercing thereof can be stabilized as well. With this configuration, the occurrence of mechanical troubles caused by the unstable conveyance of the product veneer 12 by the piercing-conveying conveyor 8 can be satisfactorily decreased.

Furthermore, the sorting apparatus 20 is configured such that when the guiding member 24 is at the standby position, the distance between the arc surface 33a' of the guiding member 24 and the tip of the needle-like bodies 8a' is sufficiently larger than the thickness of the product veneer 12. Therefore, it is possible to effectively prevent the trash veneer 14 from being pierced or hooked to the needle-like bodies 8a' of the piercing-conveying conveyor 8, specifically even if the trash veneer 14 is a distorted trash veneer 14, and the occurrence of mechanical troubles can be satisfactorily decreased.

Figure 20:
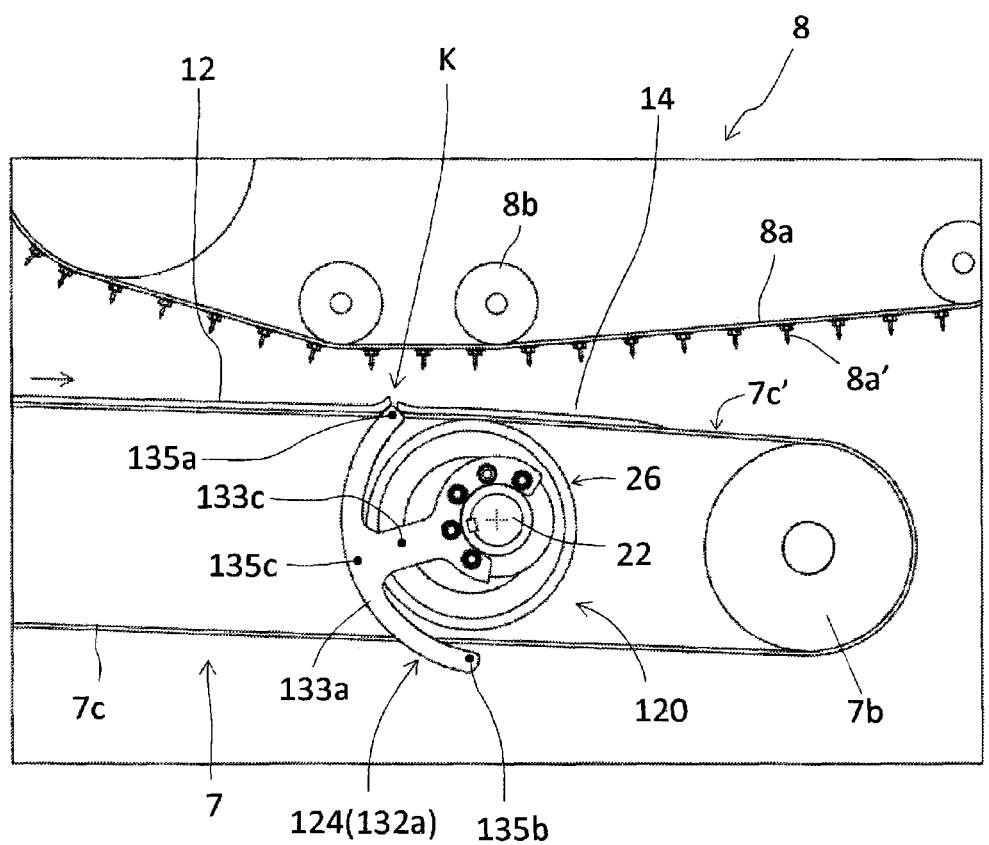
FIG. 20 is a front view of a sorting apparatus 120 of modified example as viewed from one side in the axial direction of the rotary shaft 22.

In the present exemplary embodiment, a configuration is adopted in which the end portion on one end side of the rim portion 33a of the guiding plate 32a of the guiding member 24 in the circumferential direction is the projecting end portion 35a which protrudes further than the web portion 33d in the circumferential direction; however, the present invention is not limited thereto. For example, a configuration may be adopted in which, as shown in a sorting apparatus 120 of a modified example illustrated in FIG. 20, both end portions in the circumferential direction of a rim portion 133a of a guiding member 124 are projecting end portions 135a and 135b protruding in the circumferential direction from a web portion 133c, that is, a guiding plate 132a may be configured to be substantially T-shaped when viewed from the side in the axial direction of the rotary shaft 22. Note that a connection portion 135c connects the projecting end portions 135a and 135b. Note that among the components of the sorting apparatus 120, components the same as or similar to those of the sorting apparatus 20 are denoted by the same reference numerals as the sorting apparatus 20, and the detailed description thereof is omitted. Further, although not illustrated, it goes without saying that a guide plate 132b (not shown) has the same configuration as the guide plate 132a. The sorting apparatus 120 is an example of an implementation configuration corresponding to the "veneer sheet sorting apparatus" in the present invention, and the guiding member 124 is an example of an implementation configuration corresponding to the "action section" and the "rotary member" in the present invention. In addition, the projecting end portions 135a and 135b and the connecting portion 135c are examples of an implementation configuration corresponding to the "first lifting part", the "second lifting part" and the "assisting part" in the present invention, respectively.

Figure 21:
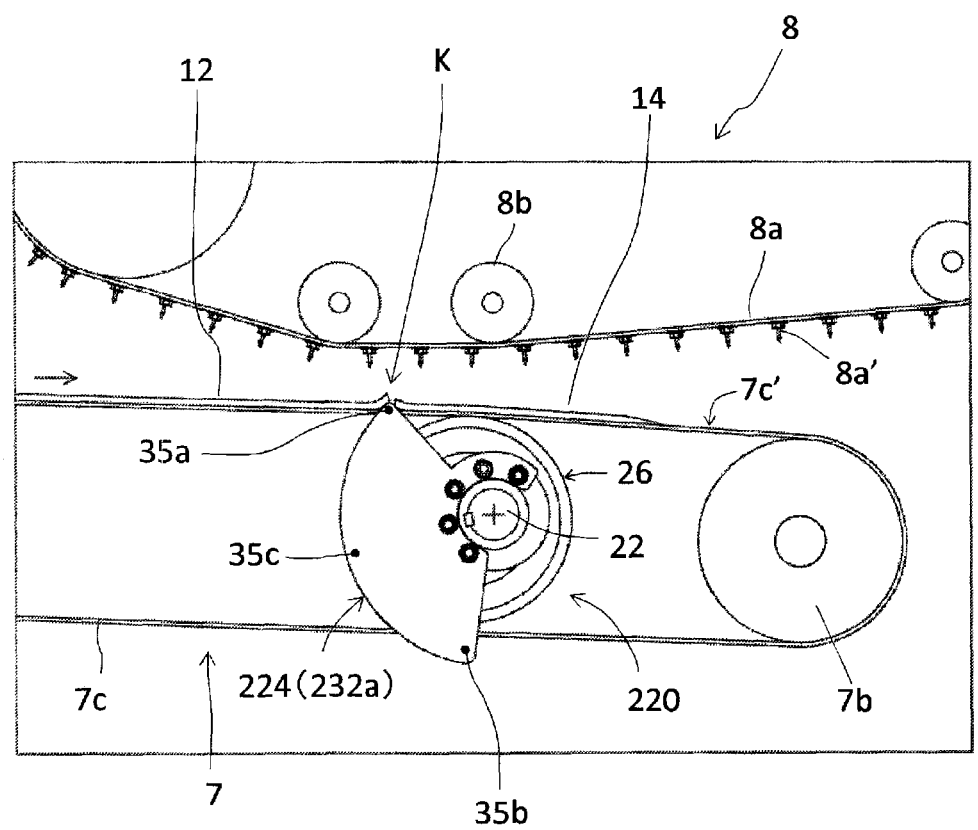
FIG. 21 is a front view of a sorting apparatus 220 of modified example as viewed from one side in the axial direction of the rotary shaft 22.

In the present exemplary embodiment, the guiding plate 32a of the guiding member 24 is configured into a substantially fan shape including the rim portion 33a, the hub portion 33b, and the web portions 33c and 33d; however, the preset invention is not limited thereto. For example, as shown in a sorting apparatus 220 of a modified example illustrated in FIG. 21, a guiding plate 232a of a guiding member 224 may be configured into a disk-like substantially fan shape. Note that among the components of the sorting apparatus 220, components the same as or similar to those of the sorting apparatus 20 are denoted by the same reference numerals as the sorting apparatus 20, and the detailed description thereof is omitted. Further, although not illustrated, it goes without saying that a guide plate 232b (not shown) has the same configuration as the guide plate 232a. The sorting apparatus 220 is an example of an implementation configuration corresponding to the "veneer sheet sorting apparatus" in the present invention, and the guiding member 224 is an example of an implementation configuration corresponding to the "action section" and the "rotary member" in the present invention.

Figure 22:
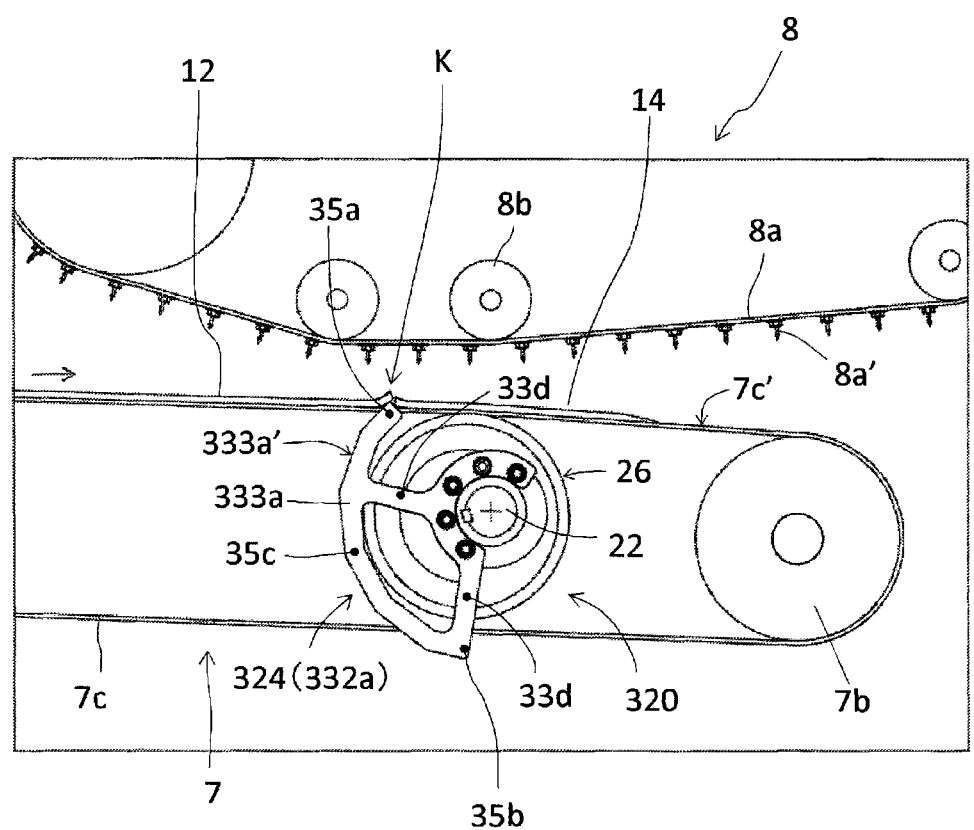
FIG. 22 is a front view of a sorting apparatus 320 of modified example as viewed from one side in the axial direction of the rotary shaft 22.

In the present exemplary embodiment, the guiding plate 32a of the guiding member 24 is configured into a substantially fan shape including the rim portion 33a having the arc surface 33a'; however, the present invention is not limited thereto. For example, as shown in a sorting apparatus 320 of a modified example illustrated in FIG. 22, a guiding plate 332a of a guiding member 324 may be configured into a substantially fan shape including a rim portion 333a having a polygonal surface 333a' formed of a plurality of planes. Note that among the components of the sorting apparatus 320, components the same as or similar to those of the sorting apparatus 20 are denoted by the same reference numerals as the sorting apparatus 20, and the detailed description thereof is omitted. The sorting apparatus 320 is an example of an implementation configuration corresponding to the "veneer sheet sorting apparatus" in the present invention, and the guiding member 324 is an example of an implementation configuration corresponding to the "action section" and the "rotary member" in the present invention. The polygonal surface 333a' is an example of an implementation configuration corresponding to the "inclined surface" in the present invention.

Figure 23:
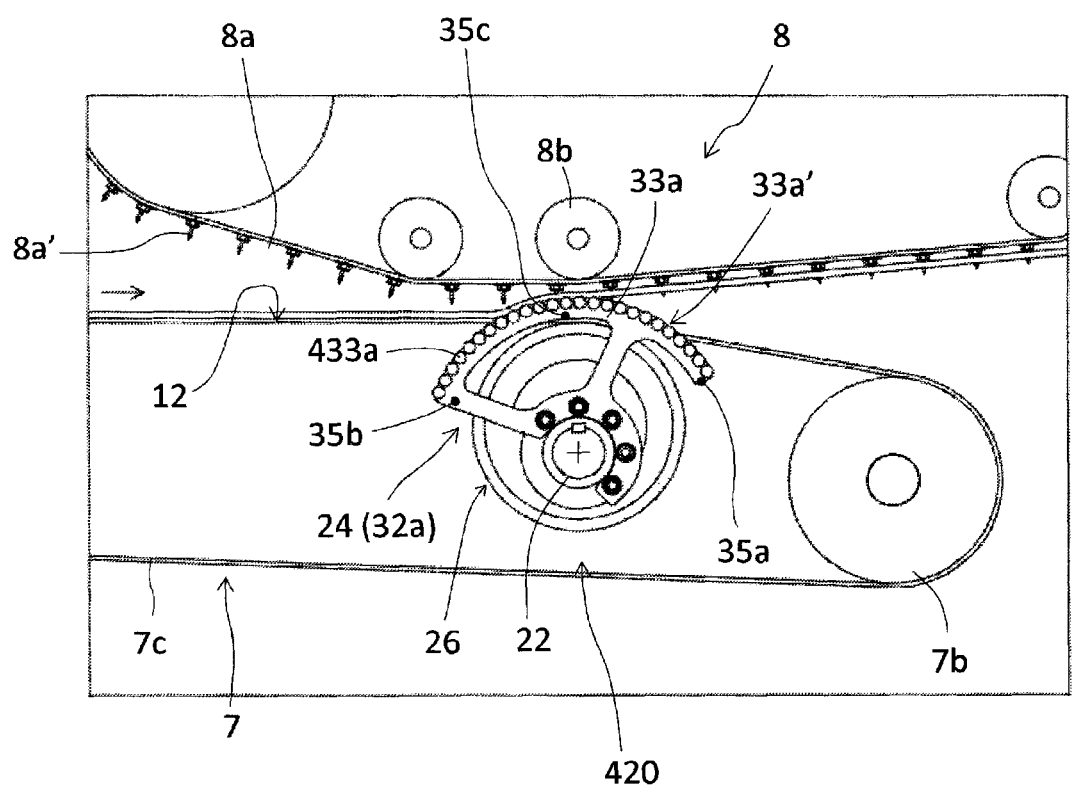
FIG. 23 is a front view of a sorting apparatus 420 of a modified example as viewed from one side in the axial direction of the rotary shaft 22.

In the present exemplary embodiment, the product veneer 12 is placed on the arc surface 33a' of the rim portion 33a of the pair of guiding plates 32a and 32b and guided to the piercing-conveying conveyor 8. However, as shown in a sorting apparatus 420 of a modified example illustrated in FIG. 23, a configuration may be adopted wherein a rolling member 433a composed of a plurality of rollers or balls is provided on the arc surface 33a' of the rim portion 33a, and the product veneer 12 is placed on the rolling member 433a and guided to the piercing-conveying conveyor 8. Note that among the components of the sorting apparatus 420, components the same as or similar to those of the sorting apparatus 20 are denoted by the same reference numerals as the sorting apparatus 20, and the detailed description thereof is omitted. The sorting apparatus 420 is an example of an implementation configuration corresponding to the "veneer sheet sorting apparatus" in the present invention.

When the product veneer 12 pierced by the needle-like bodies 8a' is being conveyed by the piercing-conveying conveyor 8, a force is applied to the product veneer 12 from the piercing-conveying conveyor 8 in the conveyance direction (right direction in FIG. 23), while on the other hand, a frictional force in the opposite direction to the force acts between the product veneer 12 and the arc surface 33a' of the guiding member 24 causing a force that may tear the product veneer 12 to act on the product veneer 12. However, according to the sorting apparatus 420 of the modified example described above, the force to tear the product veneer 12 can be minimized.

Figure 24:
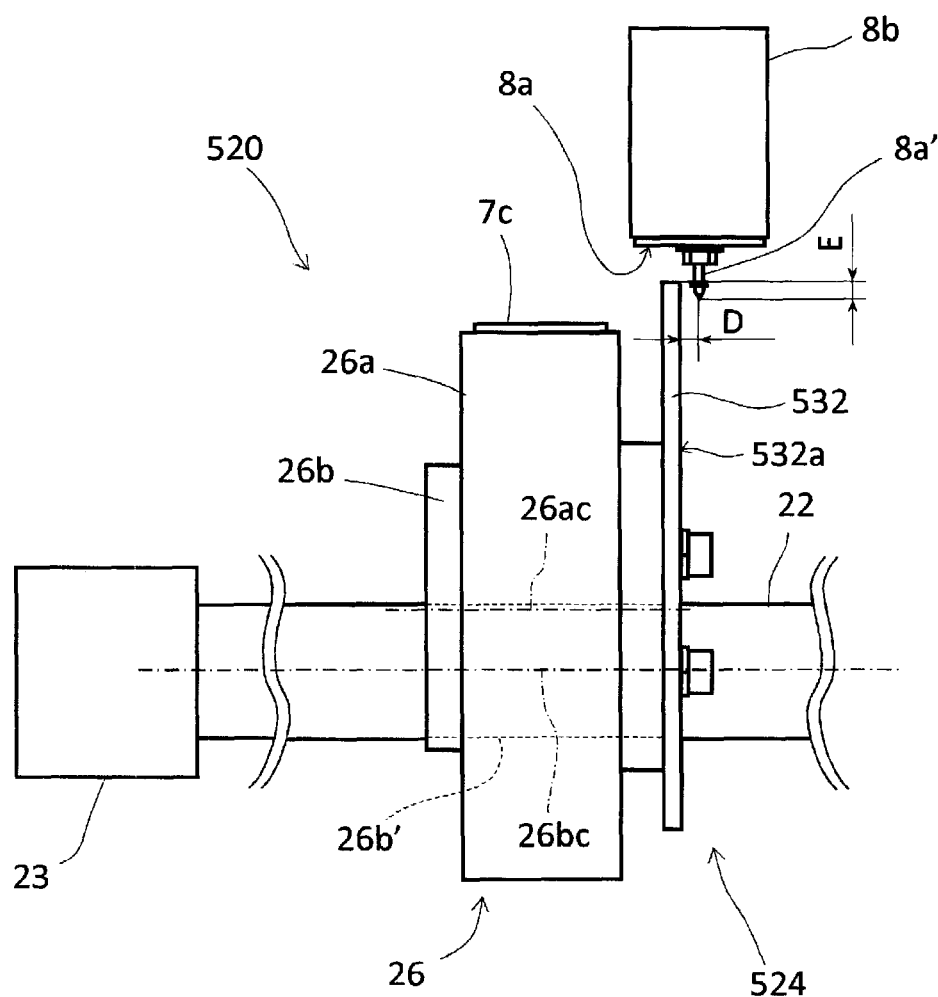
FIG. 24 is a schematic configuration diagram illustrating the outline of a configuration of a sorting apparatus 520 of a modified example.

In the present exemplary embodiment, the sorting apparatus 20 has a configuration in which the pair of guiding plates 32a and 32b of the guiding member 24 is separated from each other by a predetermined distance by the connecting boss portion 32c. However, as shown in a sorting apparatus 520 of a modified example illustrated in FIG. 24, the sorting apparatus 520 may be configured such that a guiding member 524 has only one guiding plate 532. In a case where the thickness of the veneer 10 is thin and liable to bending, by disposing the sorting apparatus 520 relative to the piercing-conveying conveyor 8 so that a distance D from the axial center of the needle-like bodies 8a' to a side surface 532a of the guiding plate 532 is smaller than a piercing depth E of the needle-like bodies 8a', the needle-like bodies 8a' can be easily pierced into the product veneer 12. On the other hand, when the thickness of the veneer 10 is thick and tough to bend, the distance D may be set larger than the piercing depth E. Note that in the structure of the guiding plate 532, portions the same as or similar to those of the guiding plate 32a are denoted by the same reference numerals as the guiding plate 32a, and the detailed description thereof is omitted. The sorting apparatus 520 is an example of an implementation configuration corresponding to the "veneer sheet sorting apparatus" in the present invention, and the guiding member 524 is an example of an implementation configuration corresponding to the "action section" and the "rotary member" in the present invention.

Figure 25:
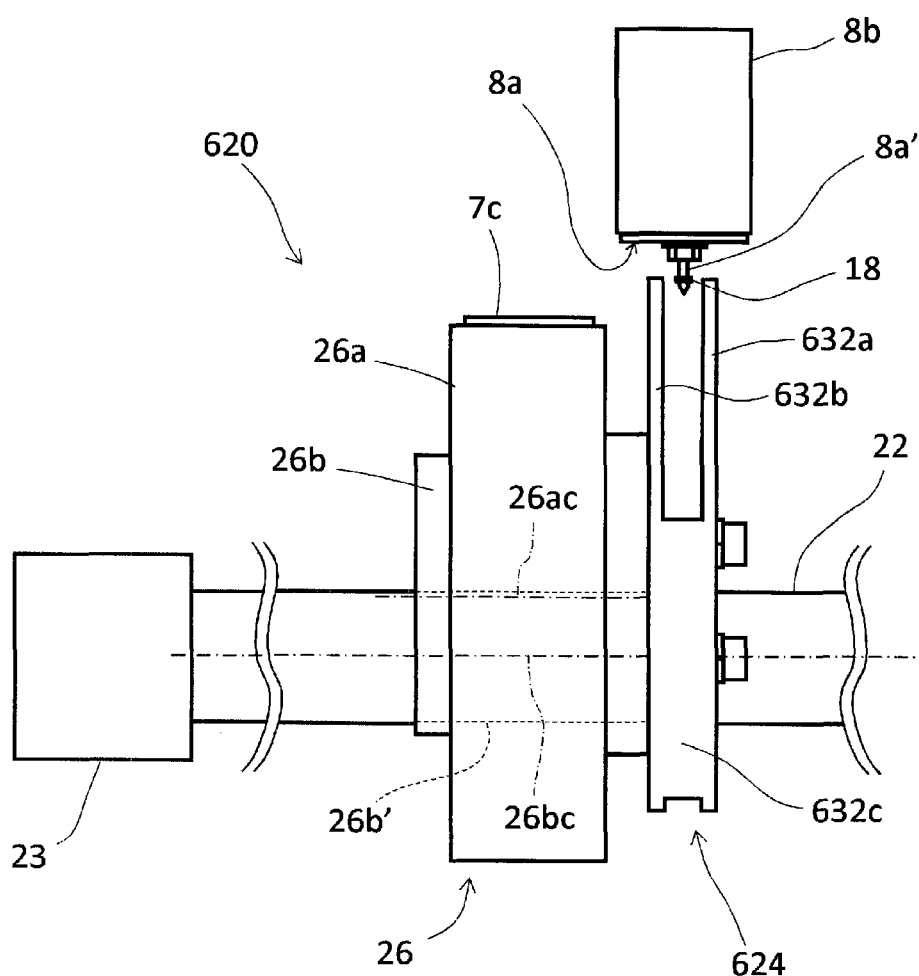
FIG. 25 is a schematic configuration diagram illustrating the outline of a configuration of a sorting apparatus 620 of a modified example.
Figure 26:
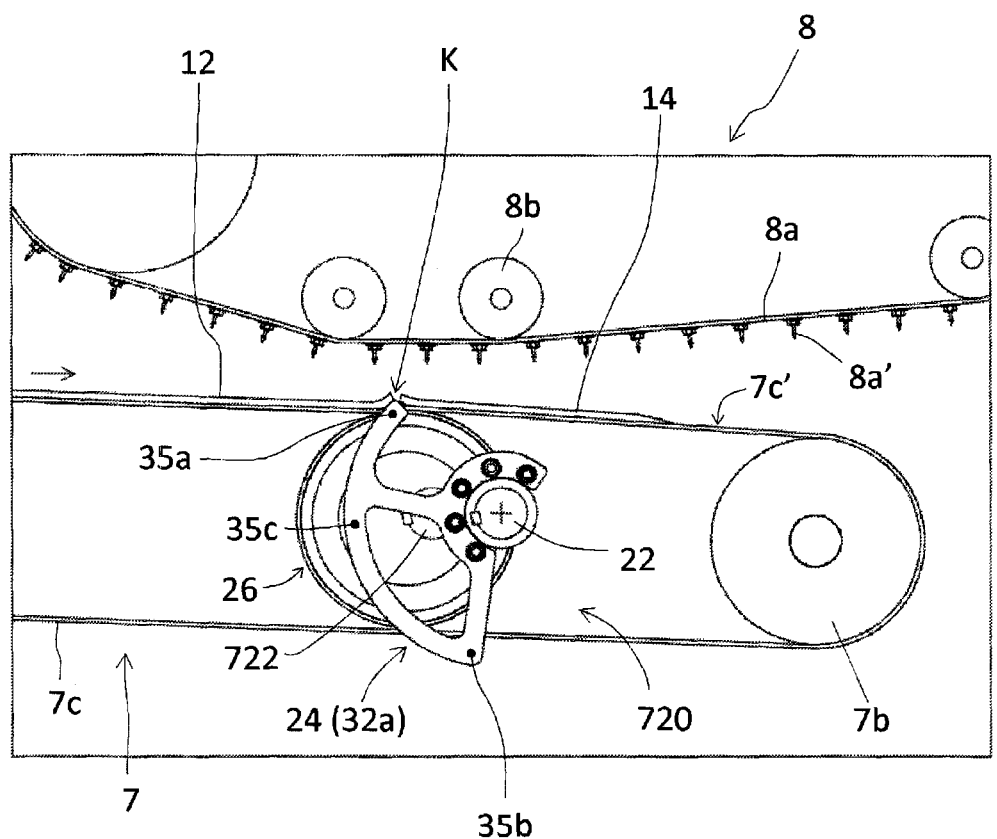
FIG. 26 is an explanatory diagram illustrating a state where a sorting apparatus 720 of a modified example begins to lift the downstream end portion of the product veneer 12.
Figure 27:
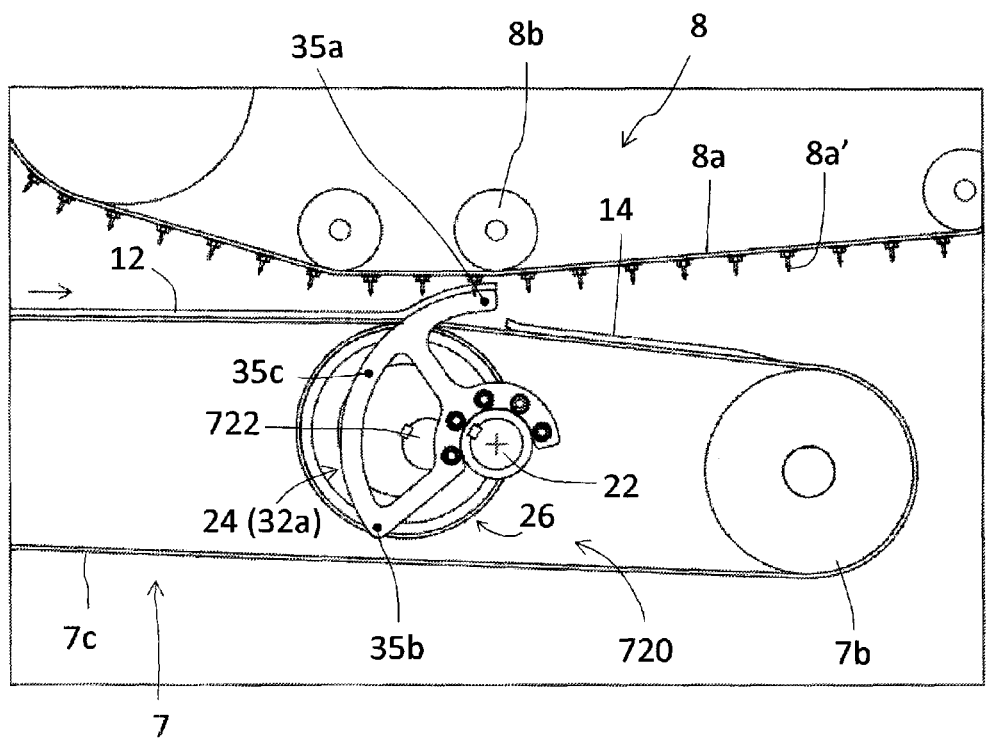
FIG. 27 is an explanatory diagram illustrating a state in which the needle-like bodies 8a' is pierced into the downstream end portion of the product veneer 12.
Figure 28:
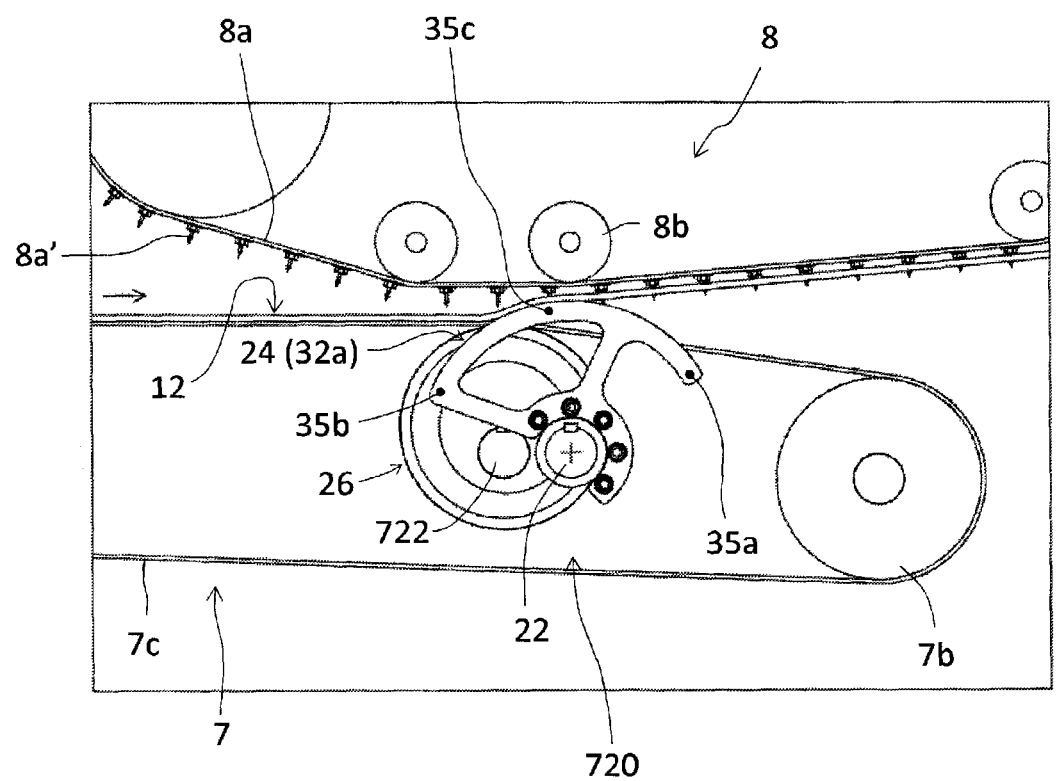
FIG. 28 is an explanatory diagram illustrating a state in which the sorting apparatus 720 of a modified example is in the piercing position.
Figure 29:
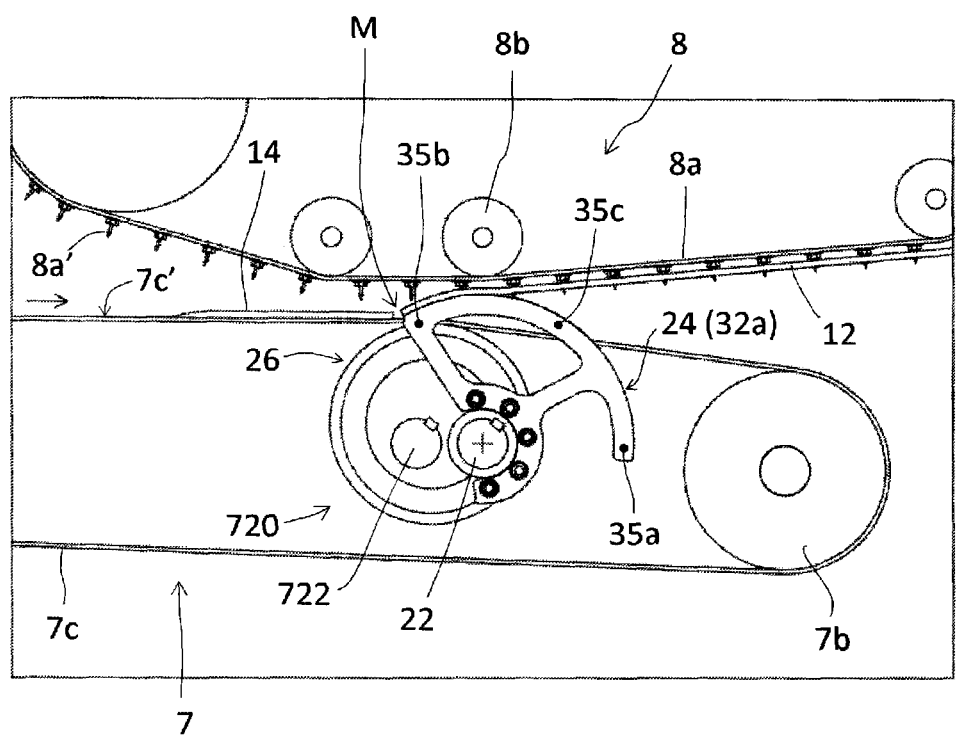
FIG. 29 is an explanatory diagram illustrating a state in which the upstream end portion of the product veneer 12 is lifted by the sorting apparatus 720 of a modified example.

In the present exemplary embodiment, the sorting apparatus 20 has a configuration in which the guiding member 24 is composed of the pair of separate guiding plates 32a and 32b and the connecting boss portion 32c. However, as shown in a sorting apparatus 620 of a modified example illustrated in FIG. 25, the sorting apparatus 620 may have a configuration in which a guiding member 624 has a pair of guiding plate portion 632a and 632b and a connecting boss portion 632c, which connects the pair of guiding plate portion 632a and 632b and disposed so as to be held therebetween, integrally formed. Note that among the components of the sorting apparatus 620, components the same as or similar to those of the sorting apparatus 20 are denoted by the same reference numerals as the sorting apparatus 20, and the detailed description thereof is omitted. The sorting apparatus 620 is an example of an implementation configuration corresponding to the "veneer sheet sorting apparatus" in the present invention, and the guiding member 624 is an example of an implementation configuration corresponding to the "action section" and the "rotary member" in the present invention.

In the present exemplary embodiment, the sorting apparatus 20 is configured to include the rotary shaft 22, and the guiding member 24 and the push-up member 26 integrated with the rotary shaft 22; however, the present invention is not limited thereto. For example, as shown in a sorting apparatus 720 of a modified example illustrated in FIGS. 26 to 29, the sorting apparatus 720 may have a configuration that includes the rotary shaft 22, a second rotary shaft 722, the guiding member 24 integrated with the rotary shaft 22, and the push-up member 26 integrated with the second rotary shaft 722. That is, in the sorting apparatus 720 of the modified example, the rotation centers of the guiding member 24 and the push-up member 26 are different. The sorting apparatus 720 is an example of an implementation configuration corresponding to the "veneer sheet sorting apparatus" in the present invention.

The sorting apparatus 720 may be configured to include a motor (not shown) for rotationally driving the second rotary shaft 722 in addition to the motor 23 for rotationally driving the rotary shaft 22, or may configured to have the motor 23 rotationally drive both the rotary shaft 22 and the second rotary shaft 722. In the case of adopting the configuration in which the second rotary shaft 722 is rotated by another motor (not shown) from the motor 23, the rotary shaft 22 and the second rotary shaft 722 can be individually rotated. Note that among the components of the sorting apparatus 720, components the same as or similar to those of the sorting apparatus 20 are denoted by the same reference numerals as the sorting apparatus 20, and the detailed description thereof is omitted.

Also, in this configuration, the lifting of the downstream end portion (boundary K) of the product veneer 12 by the projecting end 35a of the guiding member 24 in combination with the pushing up of the belt 7a, 7b, and 7c of the discharging conveyor 7 toward the piercing-conveying conveyor 8 by the push-up member 26 (rolling bearing 26a) are reliably performed, whereby the piercing of the needle-like bodies 8a' into the product veneer 12 can be stabilized without fail at the piercing position, and the upstream end portion (boundary M) of the product veneer 12 can be reliably lifted by the corner end 35b of the guiding member 24. This configuration allows the needle-like bodies 8a' to pierce only the product veneer 12 and be transported by the piercing-conveying conveyor 8 thereby delaying the progress of the abrasion of the needle-like bodies 8a'. As a result, the replacement time of the needle-like bodies 8a' can be extended and the running cost can be reduced.

Figure 30:
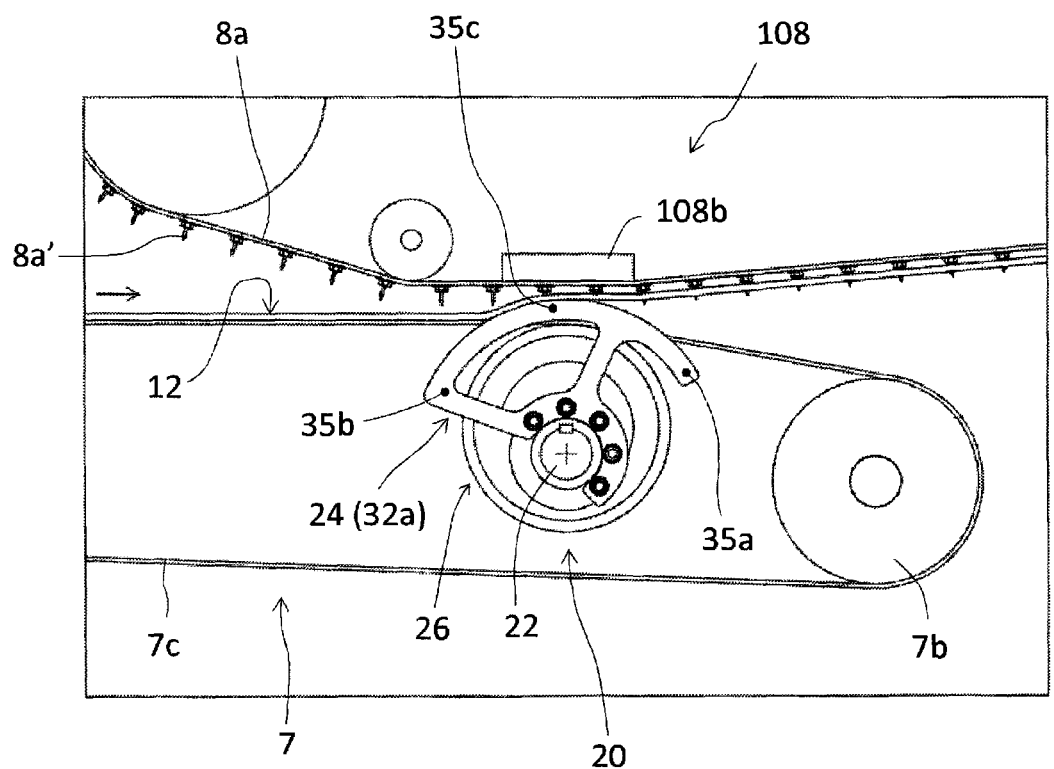
FIG. 30 is an explanatory diagram illustrating an example of a piercing-conveying conveyor 108 of a modified example.
Figure 31:
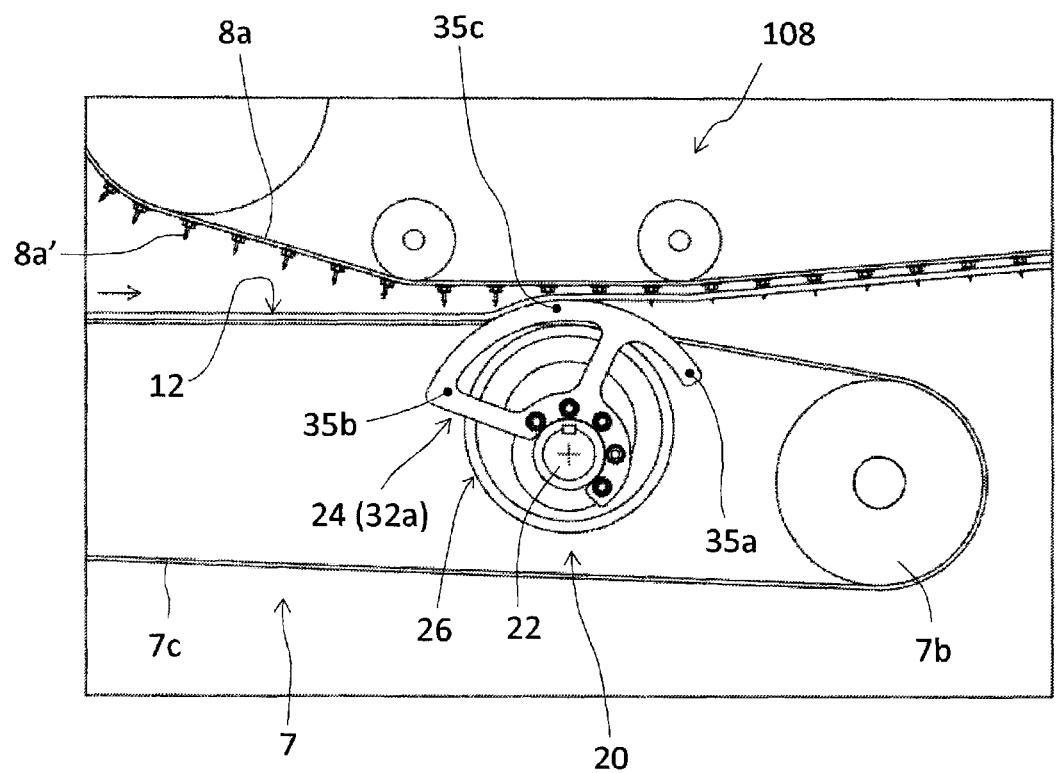
FIG. 31 is an explanatory diagram illustrating another example of the piercing-conveying conveyor 108 of a modified example.

In the present exemplary embodiment, the deflection suppression pulley 8b is configured as a roller member; however, the present invention is not limited thereto. For example, as shown in a piercing-conveying conveyor 108 of a modified example illustrated in FIG. 30, a plate-like deflection suppressing plate 108b fixed to suppress the deflection of the belt 8a may be used. Also, as illustrated in FIG. 31, if the needle-like bodies 8a' can be pierced into the veneer 10 (product veneer 12) by only the tension of the belt body 8a for cases where the thickness of the veneer 10 (product veneer 12) is thin or the hardness of the veneer plate 10 (product veneer plate 12) is low, there is no need to provide a member for suppressing the bending of the belt body 8a.

In the present exemplary embodiment, the sorting apparatus 20 is configured including the rotary shaft 22 and the guiding member 24 and the push-up member 26 integrated with the rotary shaft 22, wherein the rotation of the rotary shaft 22 causes the guiding member 24 and the push-up member 26 to rotate thereby guiding the product veneer 12 toward the piercing-conveying conveyor 8; however, the present invention is not limited thereto. For example, as shown in a sorting apparatus 820 of a modified example illustrated in FIGS. 32 to 35, a configuration may be adopted in which the product veneer 12 is guided toward the piercing-conveying conveyor 8 by linearly moving a guiding member 824 obliquely upward at an acute angle with respect to the belt 8a of the piercing-conveying conveyor 8. In addition, as shown in a sorting apparatus 920 of a modified example illustrated in FIGS. 36 to 39, a configuration may be adopted in which a guiding member 924 is linearly moved upward (upward direction in FIGS. 36 to 39) toward the piercing-conveying conveyor 8 to guide the product veneer 12 toward the piercing-conveying conveyor 8. The sorting apparatus 820 and 920 are examples of an implementation configuration corresponding to the "veneer sheet sorting apparatus" in the present invention, respectively, and each guiding member 824 and 924 is an example of an implementation configuration corresponding to the "action section" in the present invention.

Figure 32:
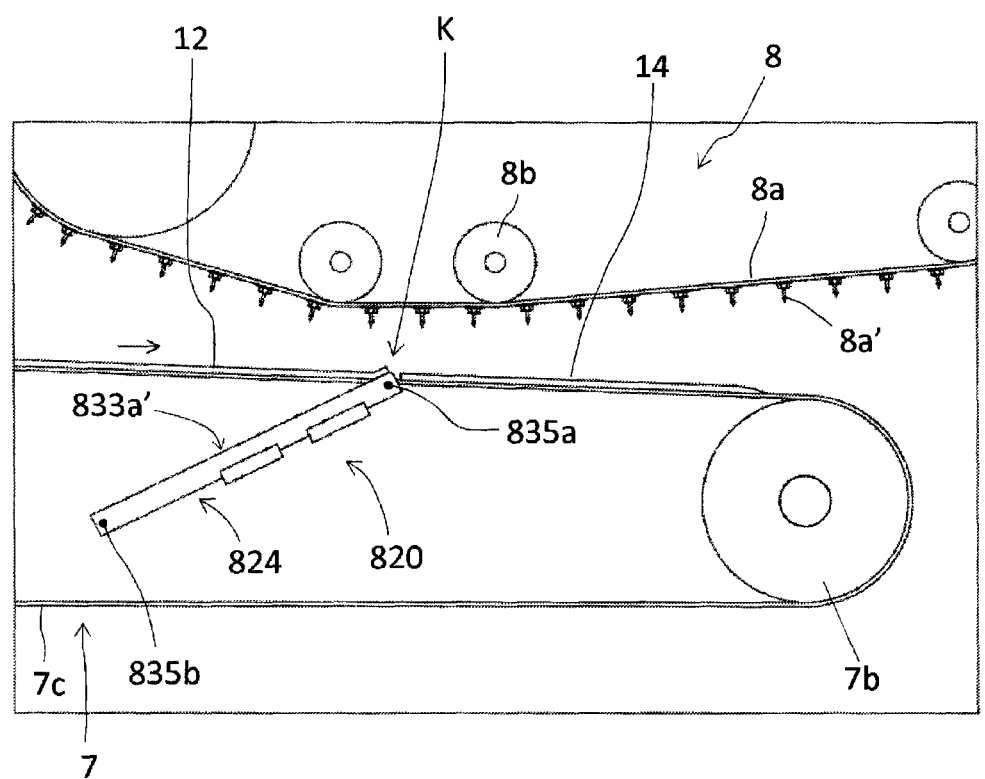
FIG. 32 is an explanatory diagram illustrating a state where a sorting apparatus 820 of a modified example begins to lift the downstream end portion of the product veneer 12.
Figure 33:
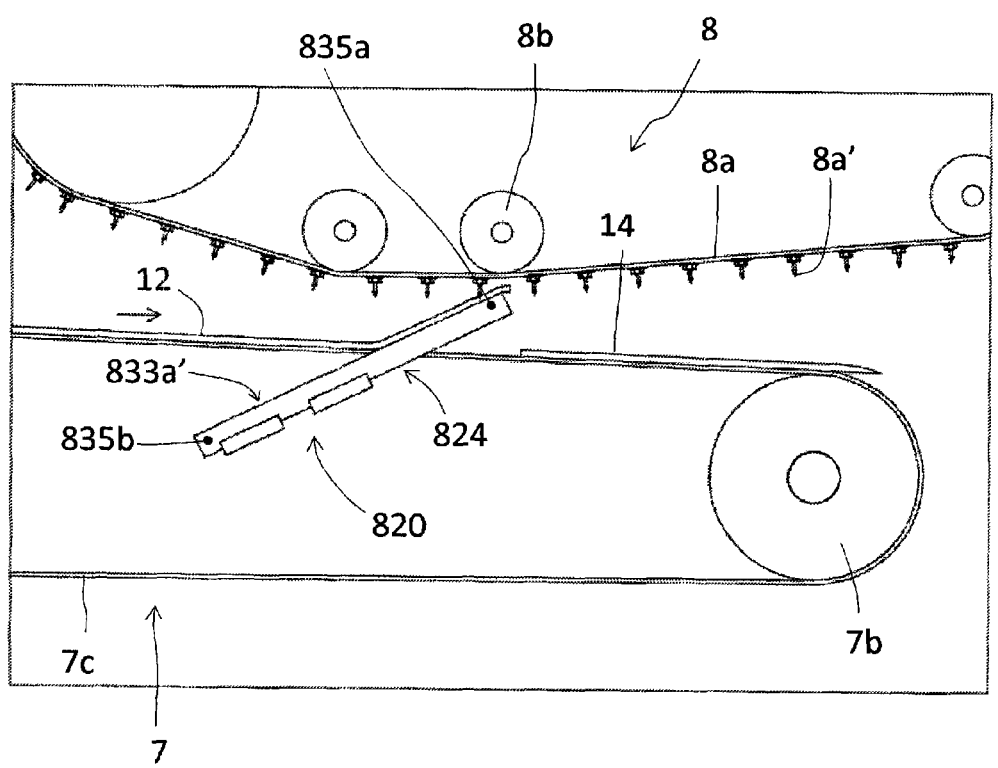
FIG. 33 is an explanatory diagram illustrating a state in which the needle-like bodies 8a' is pierced into the downstream end portion of the product veneer 12.
Figure 34:
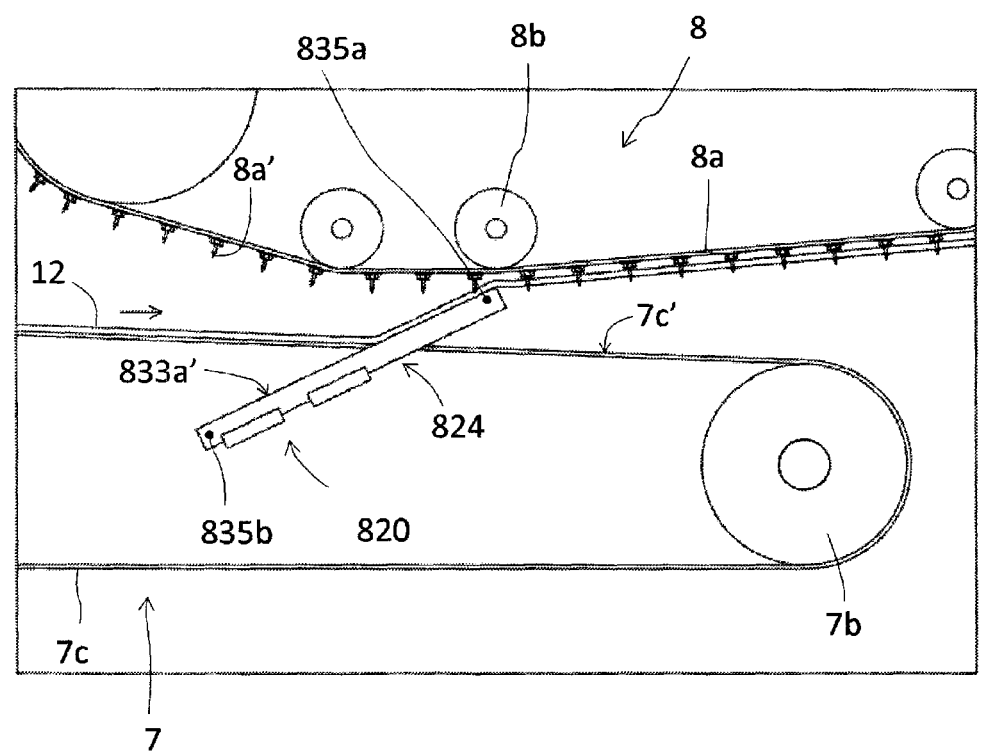
FIG. 34 is an explanatory diagram illustrating a state in which the sorting apparatus 820 of a modified example is in the piercing position.
Figure 35:
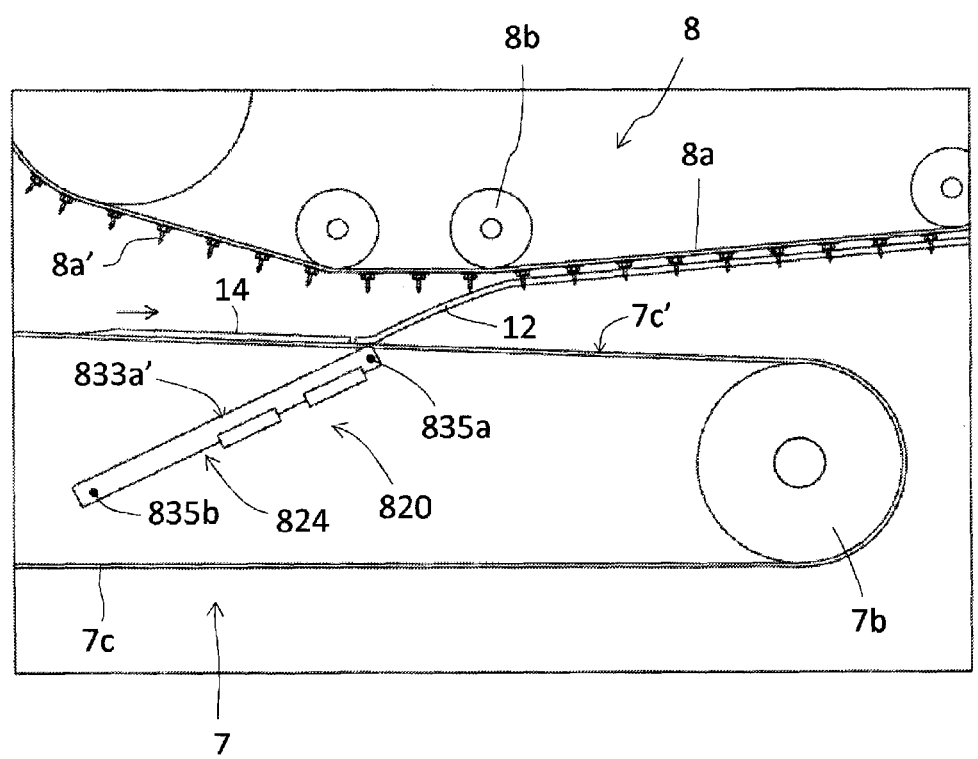
FIG. 35 is an explanatory diagram illustrating a state in which the sorting apparatus 820 of a modified example is in the process of being turned toward the standby position.
Figure 36:
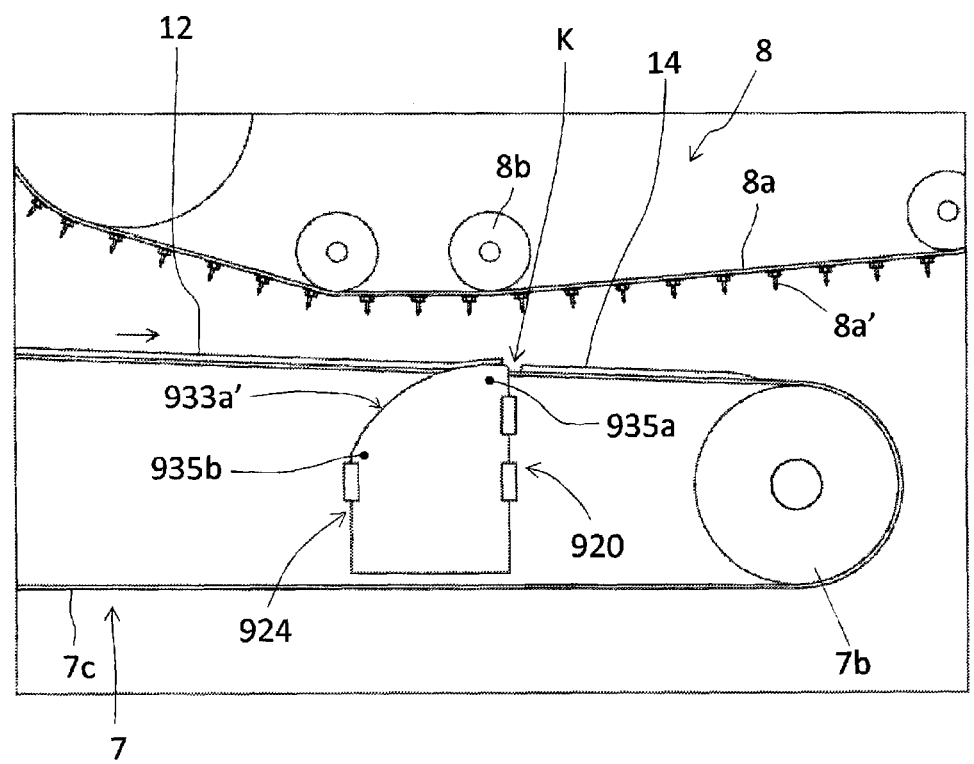
FIG. 36 is an explanatory diagram illustrating a state where a sorting apparatus 920 of a modified example begins to lift the downstream end portion of the product veneer 12.
Figure 37:
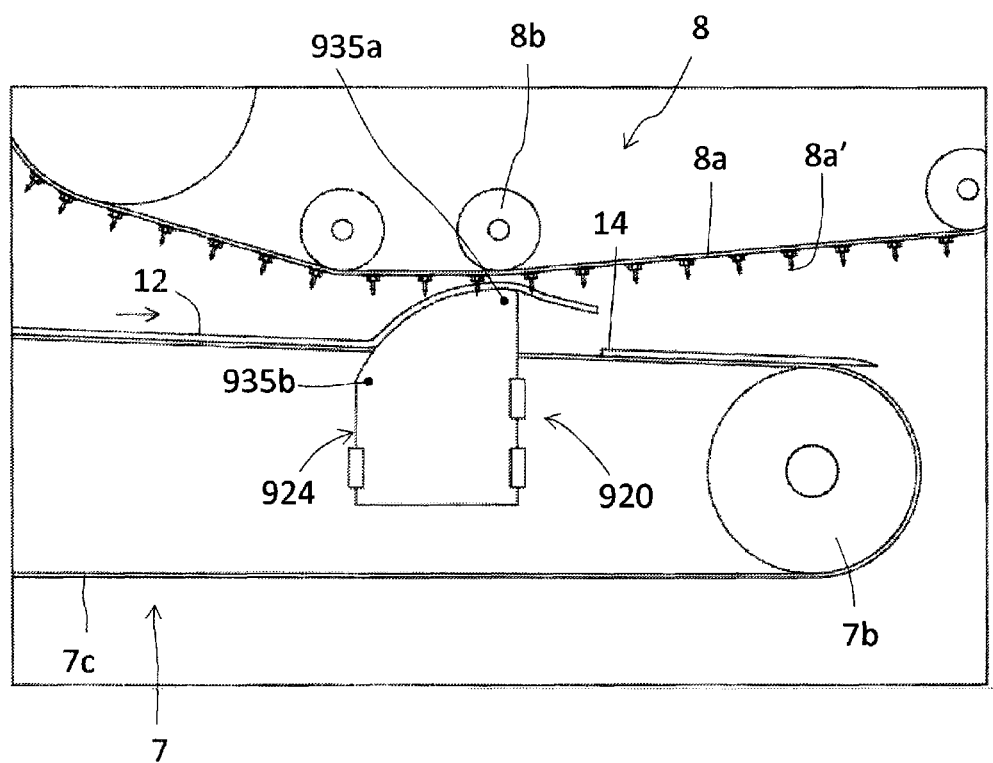
FIG. 37 is an explanatory diagram illustrating a state in which the needle-like bodies 8a' starts to pierce into the product veneer 12.
Figure 38:
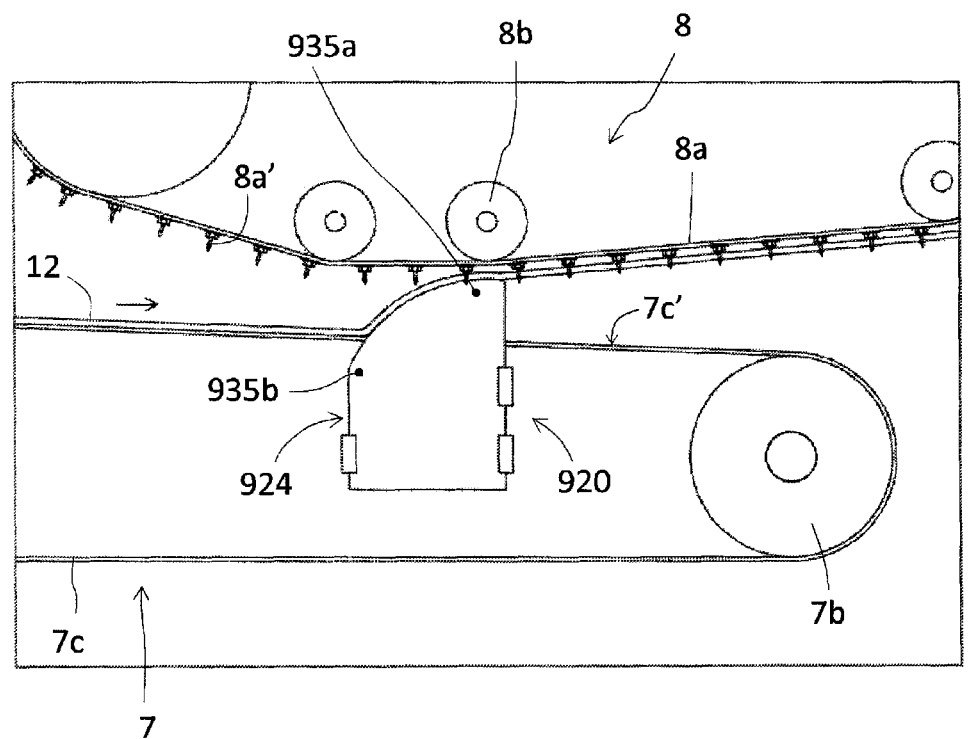
FIG. 38 is an explanatory diagram illustrating a state in which the sorting apparatus 920 of a modified example is in the piercing position.

As illustrated in FIGS. 32 to 35, the guiding member 824 is configured as an elongated member having a guiding flat surface 833a', and the guiding member 924 is configured as a plate-like member having an arc surface 933a' as illustrated in FIGS. 36 to 39. Also, in this configuration, as illustrated in FIG. 32 and FIG. 36, the downstream end (boundary K) of the product veneer 12 is reliably lifted by front corner end portions 835a and 935a of the guiding members 824 and 924, respectively, at the lifting start position. Therefore, as illustrated in FIG. 33, FIG. 34, FIG. 37 and FIG. 38, the piercing of the needle-like bodies 8a' into the product veneer 12 at the piercing position can be stabilized. It is preferable that the sorting apparatus 820 and 920 of the modified examples temporarily stops at the piercing position illustrated in FIG. 34 and FIG. 35 as with the sorting apparatus 20 of the present exemplary embodiment. As a result, the product veneer 12 continuously conveyed by the discharging conveyor 7 can be stably guided toward the piercing-conveying conveyor 8 as well as achieving a stabilized piercing of the needle-like bodies 8a' into the product veneer 12. The respective guiding flat surface 833a' and arc surface 933a' are examples of an implementation configuration corresponding to the "inclined surface" in the present invention. The front corner end portions 835a and 935a are examples of an implementation configuration corresponding to the "first lifting part" and "assisting part", respectively, in the present invention.

Figure 39:
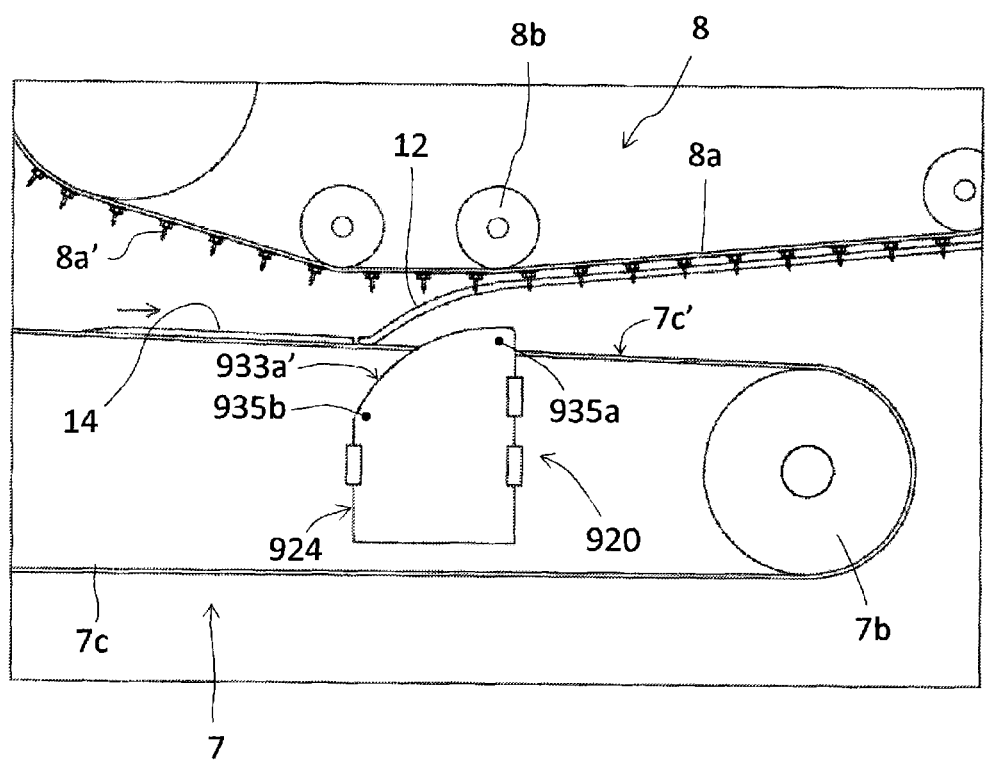
FIG. 39 is an explanatory diagram illustrating a state in which the sorting apparatus 920 of a modified example is in the process of being turned toward the standby position.

According to the sorting apparatus 820 and 920 of the modified example described above, because only the product veneer 12 is guided toward the needle-like bodies 8a' by the guiding flat surface 833a' or the arc surface 933a' allowing only the product veneer 12 to be pierced by the needle-like bodies 8a' and conveyed by the piercing-conveying conveyor 8, the progress of the abrasion of the needle 8a' can be delayed. As a result, the time to replace the needle-like bodies 8a' can be extended, whereby the running cost can be reduced. Note that it is preferable to return the guiding members 824 and 924 to the standby position before the lifting of the upstream end portion (boundary M) of the product veneer 12 is completed in order to prevent the trash veneer 14 upstream of the product veneer 12 from colliding with rear corner end portions 835b and 935b as illustrated in FIG. 35 and FIG. 39.

Figure 40:
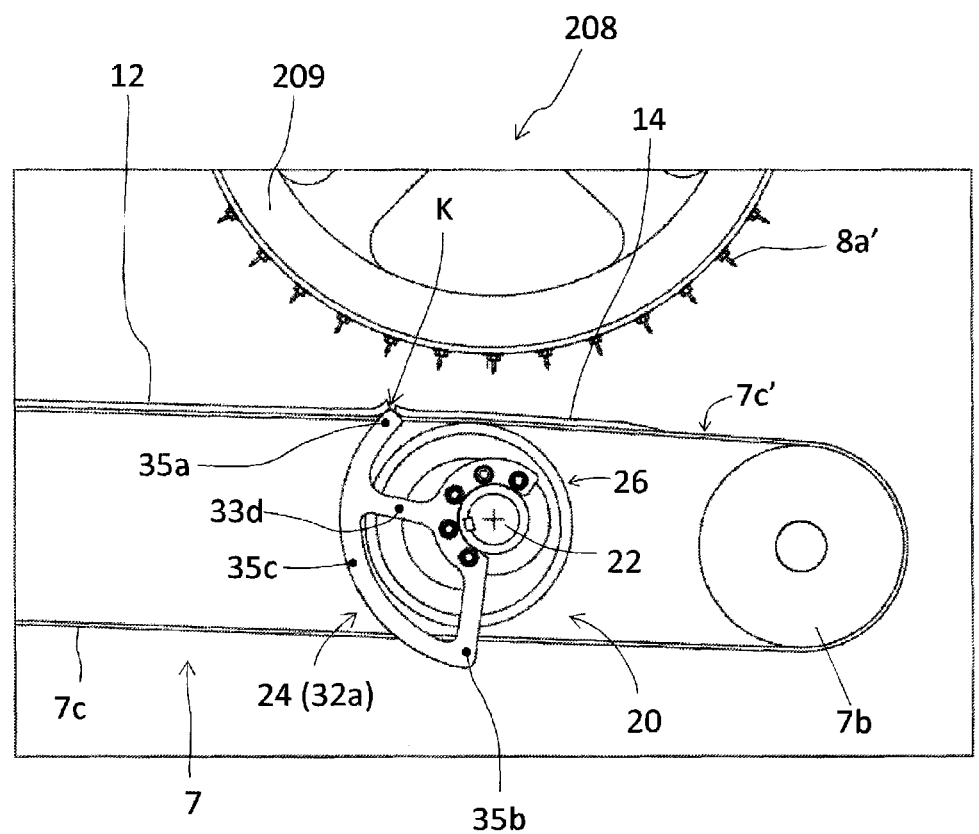
FIG. 40 is an explanatory diagram illustrating an example of a piercing-conveying conveyor 208 of a modified example.
Figure 41:
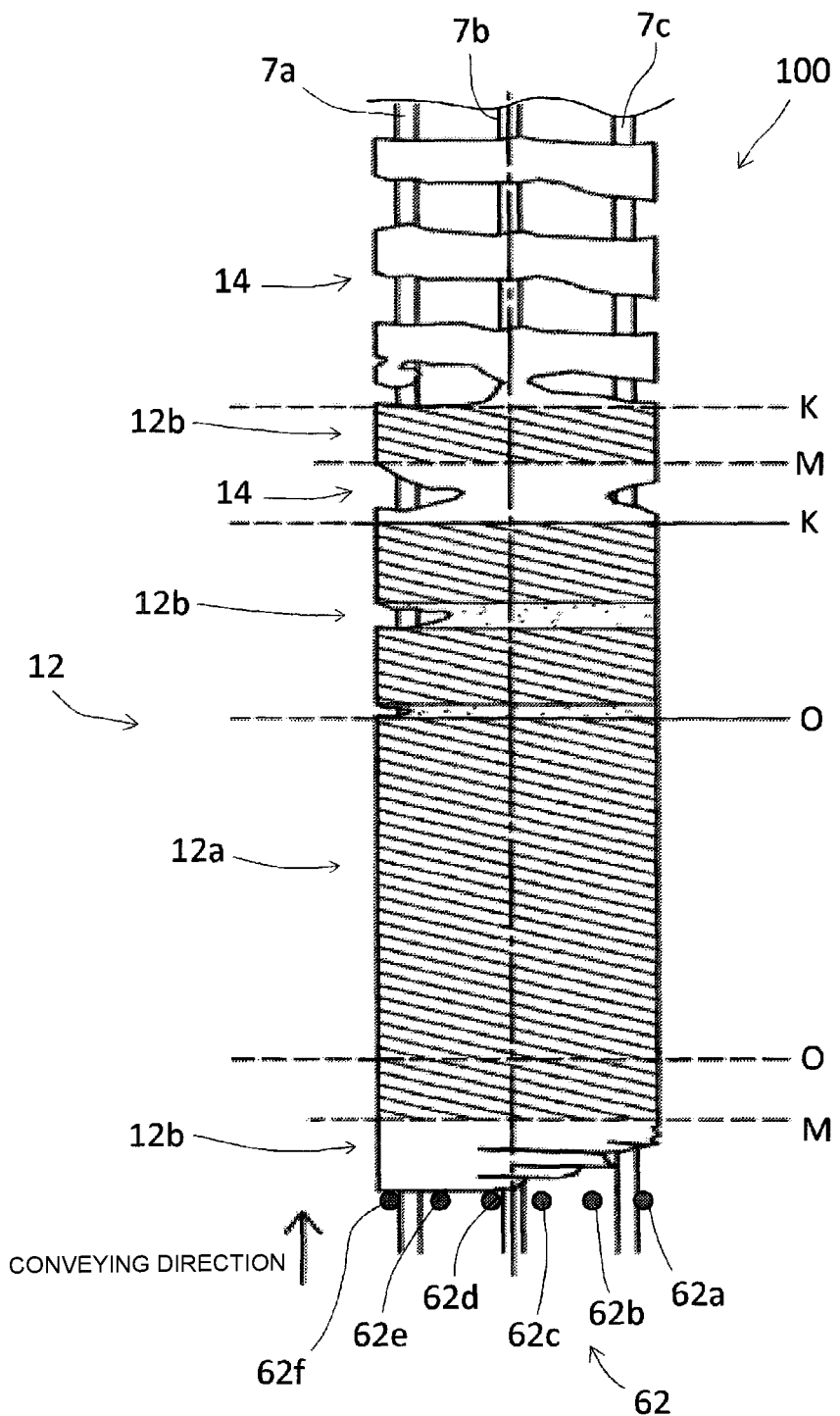
FIG. 41 is an explanatory diagram illustrating an example of the setting of boundaries K, O, M of a modified veneer 100.

In the present exemplary embodiment and the above-described modification, the piercing-conveying conveyors 8 and 108 are configured such that the belt body 8a extends in the direction of conveying the product veneer 12; however, the present invention and the above-described modification are not limited thereto. For example, as shown in a piercing-conveying conveyor 208 of a modified example illustrated in FIG. 40, a configuration thereof may include a circular pulley body 209 having a plurality of the needle-like bodies 8a'. In this case, the needle-like bodies 8a' may be directly provided on the circular pulley body 209, or a belt-like member having the plurality of needle-like bodies 8a' may be attached to the circular pulley body 209.

In the present exemplary embodiment and the above-described modification, the boundaries K and M are each provided at only one place on the veneer 10, but as shown in a veneer 100 of a modified example illustrated in FIG. 14, a plurality of each of the boundaries K and M may be provided.

In the present exemplary embodiment and the above-mentioned modified example, the configuration thereof is that the projecting end portions 35a and 135a and the front corner end portions 835a and 935a starts lifting the downstream end portion of the product veneer 12; however, the present invention and the above-mentioned modified example are not limited thereto. For example, a configuration may be adopted for a case where the rotation speed of the sorting apparatus 20, 120, 220, 320, 420, 520, 620, 620, 720, 820, 920 when the sorting apparatus 20, 120, 220, 320, 420, 520, 620, 620, 720, 820, 920 have reached the lifting start position is faster than the rotation speed of the veneer 10 conveyed by the discharging conveyor 7, the arc surfaces 33a', 133a', 933a', polygonal surface 333a', and guiding flat surface 833a' (the connecting portions 35c, 135c, etc.) excluding the projecting end portions 35a, 135a, 135b, the corner end portions 35b, the front corner end portions 835a and 935a, and the rear corner end portions 835b and 935b, the arc surfaces 33a', 133a', 933a', the polygonal surface 333a', and the guiding flat surface 833a' (the connecting portions 35c, 135c, etc.) are examples of an implementation configuration corresponding to the "first lifting part" in the present invention.

In the present exemplary embodiment and the above-described modified example, the configuration thereof is that the lifting of the upstream end portion of the product veneer 12 is completed by the corner end portion 35b and the projecting end portion 135b; however, the present invention and the above-mentioned modified example are not limited thereto. For example, a configuration may be adopted for a case that when the rotation speed of the sorting apparatus 20, 120, 220, 320, 420, 520, 620, 620, 720, 820, and 920 is slower than the rotation speed of the veneer 10 conveyed by the discharging conveyor 7 until the sorting apparatus 20, 120, 220, 320, 420, 520, 620, 620, 720, 820, and 920 have reached the lifting end position, the arc surfaces 33a' and 133a' and the polygonal surface 333a' (the connecting portions 35c, 135c, etc.), excluding the projecting end portions 35a, 135a, 135b and the corner end portion 35b, complete the lifting of the upstream end portion of the product veneer 12. In this case, apart from the projecting end portions 35a, 135a, and 135b, and the corner end portion 35b, the arc surfaces 33a' and 133a', and the polygonal surface 333a' (the connecting portions 35c, 135c, etc.) are examples of an implementation configuration corresponding to the "second lifting part" in the present invention.

In the present exemplary embodiment and the above-described modified example, the configuration thereof is such that the product veneer 12 is guided toward the piercing-conveying conveyor 8 by the guiding members 24, 124, 224, 324, 524, 624, 824, and 924; however, the present exemplary embodiment and the above-described modified example are not limited thereto. For example, instead of the configuration including the guiding members 24, 124, 224, 324, 524, 624, 824, and 924, a configuration having a suction unit capable of suctioning the product veneer 12 may be adopted wherein only the product veneer 12 is suck by the suction unit to thereby guide the product veneer 12 towards the piercing-conveying conveyor 8.

Although the present exemplary embodiment is configured to determine whether the veneer shape detection sensors 62a to 62c are turned ON in step S100 of the boundary setting process routine, the present invention is not limited thereto. For example, the present exemplary embodiment may be configured to determine in step S100 of the boundary setting process routine whether the veneer shape detection sensors 62d to 62f or the veneer shape detection sensors 62b to 62d or the veneer shape detection sensors 62c to 62e are turned on. Note that the process of step S100 of the boundary setting process routine is however not limited to determining whether three consecutive veneer shape detection sensors of the veneer shape detection sensors 62a to 62f have been turned ON but is a step executed as one of the determinations to determine whether or not the veneer 10 peeled by the rotary race 2 and conveyed by the loading conveyor 6 has a width dimension from which at least the short end veneer 12b can be procured. That is, the number of veneer shape detection sensors 62a to 62f that are turned ON can be determined by the prescribed width dimension of the short end veneer 12b.

Although the present exemplary embodiment is configured to determine in step S102 of the boundary setting process routine whether the ON state of the veneer shape detection sensors 62a to 62c have continued for the length of the first predetermined time, the present invention is not limited thereto. For example, the present invention may be configured to determine whether the veneer 10 has moved a first predetermined distance while the veneer shape detection sensors 62a to 62c turned ON. Note that the first predetermined distance can be calculated based on the pulse signal output from the pulse generator 6a and is set to a movement distance corresponding to a length dimension in which the short end veneer 12b can be procured.

In the present exemplary embodiment, the boundary M is set when it is determined in step S122 of the boundary setting process routine that the veneer shape detection sensor 62a is turned OFF; however, the present invention is not limited thereto. A configuration may be adopted in which the boundary M is set when it is determined that any one or two or more of the veneer shape detection sensors 62a to 62f are turned OFF.

The present exemplary embodiment shows an example of a mode for carrying out the present invention. Therefore, the present invention is not limited to the configuration of the present embodiment. In addition, the correspondence relation between each component of this exemplary embodiment and those of the present invention is shown in the following.

REFERENCE SIGNS LIST

1 Veneer sheet conveying apparatus (Veneer sheet conveying apparatus)
2 Rotary lathe (Veneer cutting machine)
2a Spindle
2b Cutter
4 Cutting device (Cutter)
4a Rotary blade
4b Rotary table
4c Anvil roll
6 Loading conveyor (Loading unit)
6a Pulse generator
7 Discharging conveyor (Discharging unit)
7a Belt
7b Belt
7c Belt
7d Pulse generator
7e Support shaft
7a' Mounting surface (Mounting surface)
7b' Mounting surface (Mounting surface)
7c' Mounting surface (Mounting surface)
8 Piercing-conveying conveyor
8a' Needle-like body (Needle-like body)
8b Deflection suppression pulley
8c Swinging needle removal claw
8d Fixed needle removal claw
10 Veneer
12 Product veneer (Product veneer)
12a Standard-length veneer
12b Short end veneer
14 Trash veneer
18 Falling off prevention portion
20 Sorting device (Veneer sheet sorting apparatus)
22 Rotary shaft
23 Motor
24 Guiding member (Action section, Rotary member)
26 Push-up member (Push-up section)
26a Rolling bearing (Second rotary member)
26b Boss member
26b' Axial hole
26ac Axial center
26bc Axial center
32a Guiding plate
32b Guiding plate
32c Connecting boss portion
33a Rim portion
33a' Arc surface (Inclined surface, Arc surface)
33b Hub portion
33c Web portion
33d Web portion
35a Projecting end portion (First lifting part)
35b Corner end portion (Second lifting part)
35c Connecting portion (Assisting part)
62 Veneer shape detection sensor
62a Veneer shape detection sensor
62b Veneer shape detection sensor
62c Veneer shape detection sensor
62d Veneer shape detection sensor
62e Veneer shape detection sensor
62f Veneer shape detection sensor
64 Cutting detection sensor (Signal transmission unit)
72 Transport conveyor
72a Deposition box
74 Transport conveyor
74a Deposition box
76 Trash conveyor
80 Control device (Control device)
100 Veneer (Veneer)
108 Piercing-conveying conveyor
108b Deflection suppressing plate
120 Sorting device
124 Guiding member (Action section, Rotary member)
132a Guiding plate
133a Rim portion
133c Web portion
135a Projecting end portion (First lifting part)
135b Projecting end portion (Second lifting part)
135c Connecting portion (Assisting part)
208 Piercing-conveying conveyor
209 Pulley body
220 Sorting device (Veneer sheet sorting apparatus)
224 Guiding member (Action section, Rotary member)
232a Guiding plate
320 Sorting device (Veneer sheet sorting apparatus)
324 Guiding member (Action section, Rotary member)
332a Guiding plate
333a Rim portion
333a' Polygonal surface (Inclined surface)
420 Sorting device (Veneer sheet sorting apparatus)
433a Rolling member
520 Sorting device (Veneer sheet sorting apparatus)
524 Guiding member (Action section, Rotary member)
532 Guiding plate
532a Side surface
620 Sorting device (Veneer sheet sorting apparatus)
624 Guiding member (Action section, Rotary member)
632a Guiding plate portion
632b Guiding plate portion
632c Connecting boss portion
720 Sorting device (Veneer sheet sorting apparatus)
722 Second rotary shaft
820 Sorting device (Veneer sheet sorting apparatus)
824 Guiding member (Action section)
833a' Guiding flat surface (Inclined surface)
835a Front corner end portion (First lifting part, Assisting part)
835b Rear corner end portion
920 Sorting device (Veneer sheet sorting apparatus)
924 Guiding member (Action section)
933a' Arc surface (Inclined surface)

935a Front corner end portion (First lifting part, Assisting part)
935b Rear corner end portion
L Raw wood
K Boundary
M Boundary
Boundary
VL Straight line
Fk Boundary K setting flag
Fo Boundary O setting flag
D Distance
G Predetermined gap

What is claimed is:

1. A veneer sheet conveying apparatus comprising:
a cutter disposed along a direction of veneer conveyance;
a discharging unit having a mounting surface for mounting a product veneer and a trash veneer cut from a veneer by the cutter, the discharging unit disposed downstream of the cutter in the direction of veneer conveyance so as to be capable of discharging the product veneer and the trash veneer downstream in the direction of veneer conveyance;
a piercing-conveying unit having a plurality of needle-like bodies disposed above the discharging unit so that the needle-like bodies are opposed to the mounting surface of the discharging unit so as to be capable of conveying the product veneer toward a subsequent process; and
a veneer sheet sorting apparatus configured to guide the product veneer toward the piercing-conveying unit so that the product veneer is pierced by the needle-like bodies, and configured to guide the trash veneer downstream in the direction of veneer conveyance so that the trash veneer is not pierced by the needle-like bodies, the veneer sheet sorting apparatus including
an action section that acts directly on the product veneer to guide the product veneer toward the piercing-conveying unit, the action section being switchable between a guiding state where a distance between at least a portion of the action section and the needle-like bodies is smaller than a thickness of the veneer and a non-guiding state where the distance is greater than the thickness of the veneer, and the action section enters the guiding state when the veneer is the product veneer and enters the non-guiding state when the veneer is the trash veneer,
a rotary shaft, and
a rotary member, as the action section, integrally mounted to the rotary shaft, the rotary member being switchable between the guiding state and the non-guiding state by rotation of the rotary shaft,
a push-up section capable of pushing up at least a part of the mounting surface in a direction approaching the needle-like bodies, the push-up section configured to push up at least a part of the mounting surface to guide the product veneer toward the piercing-conveying unit, the push-up section having a second rotary member integrally and eccentrically located on the rotary shaft, the second rotary member configured to abut the mounting surface from under the mounting surface, by rotation of the rotary shaft, to push up the mounting surface.

2. The veneer sheet conveying apparatus according to claim 1, wherein
the action section includes: a first lifting part configured to lift a downstream end portion of the product veneer; and an assisting part coupled to the first lifting part configured to assist the piercing of the needle-like bodies into the product veneer.

3. The veneer sheet conveying apparatus according to claim 2, wherein
the rotary member further includes a second lifting part configured to lift an upstream end portion of the product veneer.

4. The veneer sheet conveying apparatus according to claim 1, wherein
the action section has an inclined surface that is inclined upward downstream in the direction of veneer conveyance, when entering the guiding state; and
the action section is configured such that the inclined surface guides the product veneer toward the piercing-conveying unit.

5. The veneer sheet conveying apparatus according to claim 3, wherein
the action section has an inclined surface that is inclined upward downstream in the direction of veneer conveyance, when entering the guiding state; and
the action section is configured such that the inclined surface guides the product veneer toward the piercing-conveying unit.

6. The veneer sheet conveying apparatus according to claim 5, wherein
the inclined surface is a circular arc surface having a centerline on which the rotary shaft is located, and
the first lifting part, the assisting part, and the second lifting part are connected to each other by the circular arc surface.

7. The veneer sheet conveying apparatus according to claim 2, further comprising
a controller for controlling the discharging unit, the piercing-conveying unit, and the veneer sheet sorting apparatus,
the controller configured to drive-control the veneer sheet sorting apparatus so that the first lifting part of the action section lifts the downstream end portion of the product veneer, configured to drive-control the veneer sheet sorting apparatus so that the action section enters the assisting state in which the assisting part assists the piercing of the needle-like bodies into the product veneer, and configured to drive-control the veneer sheet sorting apparatus so that the operation of the action section is temporarily stopped when the action section enters the assisting state.

8. The veneer sheet conveying apparatus according to claim 7, wherein
the controller is configured to drive-control the veneer sheet sorting apparatus so that, at least when the downstream end portion of the product veneer is being lifted by the first lifting part, the conveying speed of the action section to convey the product veneer toward the piercing-conveying unit is substantially the same as the conveying-out speed of the veneer conveyed by the discharging unit.

9. The veneer sheet conveying apparatus according to claim 3, further comprising:
a controller configured to drive-control the veneer sheet sorting apparatus so that, at least when the upstream end portion of the product veneer is being lifted by the second lifting part, the conveying speed of the rotary member to convey the product veneer toward the piercing-conveying unit is substantially the same as the conveying-out speed of the veneer conveyed by the discharging unit.

10. The veneer sheet conveying apparatus according to claim 1, further comprising
a signal transmission member for transmitting a signal when the veneer is cut into the product veneer and the trash veneer by the cutter,
wherein the controller is configured to drive-control the veneer sheet sorting apparatus based on the transmitted signal.

11. The veneer sheet conveying apparatus according to claim 1, further comprising:
a controller configured to drive-control the discharging unit so that the veneers cut by the cutter are conveyed out toward the veneer sheet sorting apparatus in a state where a predetermined gap is secured between the cut veneers.

12. The veneer sheet conveying apparatus according to claim 11, further comprising
a loading unit disposed between a veneer cutting machine and the cutter and configured to load to the cutter the veneer discharged from the veneer cutting machine, wherein
the controller is configured to drive-control the loading unit and the discharging unit to make a conveying-in speed of the veneer conveyed in by the loading unit different from a conveying-out speed of the veneer conveyed out by the discharging unit.

13. A method of controlling a veneer sheet conveying apparatus according to claim 1, the method comprising:
(a) conveying the product veneer and the trash veneer downstream in the direction of veneer conveyance by the discharging unit;
(b) guiding the product veneer toward the piercing-conveying unit by the veneer sorting apparatus so that the needle-like bodies are pierced into the product veneer; and
(c) guiding the trash veneer to the downstream by the veneer sorting apparatus so that the needle-like bodies are not pierced into the trash veneer.

14. The veneer sheet conveying apparatus according to claim 1, wherein the plurality of needle-like bodies of the piercing-conveying unit are opposed to and separated from the mounting surface of the discharging unit by a distance greater than the thickness of the veneers.

* * * * *